(12) United States Patent
Sako et al.

(10) Patent No.: US 7,653,198 B2
(45) Date of Patent: Jan. 26, 2010

(54) RECORDING MEDIUM FOR DATA INCLUDING CONCEALMENT DATA AND RECORDING/REPRODUCING METHOD FOR SUCH DATA

(75) Inventors: Yoichiro Sako, Tokyo (JP); Junichi Kudo, Tokyo (JP)

(73) Assignee: Sony Corporation (JP)

( * ) Notice: Subject to any disclaimer, the term of this patent is extended or adjusted under 35 U.S.C. 154(b) by 1832 days.

(21) Appl. No.: 10/089,771

(22) PCT Filed: Aug. 2, 2001

(86) PCT No.: PCT/JP01/06663

§ 371 (c)(1),
(2), (4) Date: Jul. 22, 2002

(87) PCT Pub. No.: WO02/13451

PCT Pub. Date: Feb. 14, 2002

(65) Prior Publication Data

US 2003/0051237 A1    Mar. 13, 2003

(30) Foreign Application Priority Data

Aug. 4, 2000   (JP) ............................. 2000-237662
Apr. 27, 2001  (JP) ............................. 2001-133600

(51) Int. Cl.
H04N 7/167 (2006.01)
(52) U.S. Cl. ...................................................... 380/239
(58) Field of Classification Search ....................... None
See application file for complete search history.

(56) References Cited

U.S. PATENT DOCUMENTS 6,614,914 B1 *  9/2003  Rhoads et al. ............... 382/100
7,039,189 B1 *  5/2006  Kienzle et al. ............... 380/239

* cited by examiner

Primary Examiner—Brandon S Hoffman
(74) Attorney, Agent, or Firm—Lerner, David, Littenberg, Krumholz & Mentlik, LLP

(57) ABSTRACT

This invention is directed to a recording medium on which contents data of movie, etc. is recorded. At the position where reproduction is carried out prior to first data consisting of contents data in reproducing the first data, there is recorded second data like advertisement data in which contents concealment data for concealing contents data is buried. In reproduction of the first data recorded on this recording medium, contents concealment data is extracted from the second data, and cipher implemented to the first data which has been read out from the recording medium is decoded by using the extracted contents concealment data. Thus, the first data is reproduced subsequently to the second data.

56 Claims, 21 Drawing Sheets

RECORDING MEDIUM FOR DATA INCLUDING CONCEALMENT DATA AND RECORDING/REPRODUCING METHOD FOR SUCH DATA

TECHNICAL FIELD

This invention relates to a recording medium adapted for concealing contents data on the basis of contents concealment data caused to be included in predetermined data to reproduce the predetermined data to thereby extract the contents concealment data to have ability to reproduce concealed contents data, and a method of recording or reproducing such a recording medium.

BACKGROUND ART

Contents data for movies, video movies or television programs, etc. are distributed in the state where information such as advertisements, etc. of company cooperative as sponsor are attached by using a recording medium such as a television broadcast, a video tape cassette or a DVD (Digital Versatile Disc), etc. For example, recording media where contents are recorded with advertisements are offered to viewers at low cost in such a manner that advertisements are recorded along with the contents.

In recent years, contents data including audio data and picture data are also delivered through a network by popularization of the so-called Internet. Followed by this, at a website of the Internet, Banner advertisement is provided. This Banner advertisement is an advertisement provided for propaganda at a portion of the website. For example, in the Banner advertisement, the user carries out a click (select) operation by a mouse, etc. so that the web page for propaganda is newly opened. At this time, the number of times in which the Banner advertisement is clicked, i.e., the number of accesses of user also serves as index indicating an effect of the advertisement.

Meanwhile, with the popularization of recording apparatuses such as a video tape recorder, a hard disc recorder or an optical disc recorder, etc., viewers can carry out audition of contents of movies, etc. recorded on the recording medium according to their tastes. In more practical sense, viewers have also been able to carry out the audition of only contents by making use of various functions of the recording apparatus such as skip of reading or CM canceler, etc. For example, as described above, a movie broadcasted by television broadcast can be recorded on the recording medium in the state in which advertisements are included. In this case, in appreciating the main part (compilation) of the movie, viewers can also reproduce only the main part without reproducing an advertisement which is not related to the main part. This approach cannot exhibit effects that the advertisement, etc. brings about. Such a problem similarly applies to copyright management data as copyright information attached to contents such as movie or music, etc., and the viewers can reproduce only the main part (compilation) without reproducing copyright information which is not related to the main part.

Since the Banner advertisement of internet cannot force select operation (click) with respect to user, effect of the Banner advertisement depended upon interest or taste of user.

As a method of delivering contents, there is a method of delivering enciphered contents to respective terminal equipments through internet, etc. to separately carry out charging with respect to a person who desires to conduct viewing of the contents and to provide a cipher key. When the cipher key is offered to a person who carries out viewing, only the cipher key is provided through internet, etc., and any additional value is not added to this cipher key.

DISCLOSURE OF THE INVENTION

This invention has been proposed in view of actual circumstances as described above, and an object of this invention is to provide a recording medium where there is recorded data in which additional value is added to predetermined data in which reproduction is necessarily carried out in order to reproduce contents data so that effect of advertisement, etc. attached to contents can be enhanced, and a recording method and a reproducing method for such data.

Another object of this invention is to provide a transmitting method for data recorded with respect to the recording medium according to this invention.

A recording medium according to this invention proposed in order to attain objects as described above is adapted so that, in reproducing first data consisting of contents data, at position where reproduction is carried out prior to the first data, there is recorded second data in which contents concealment data for concealing contents data is buried. In this case, the second data is at least one advertisement data, and this second data consists of, e.g., plural advertisement data and contents concealment data are buried in the state distributed into plural advertisement data.

A method of carrying out recording with respect to a recording medium according to this invention comprises steps of burying contents concealment data for concealing first data consisting of contents data into delivered second data, implementing concealment processing to the first data by using the contents concealment data, implementing encode processing to the second data in which contents concealment data is buried and contents data to which concealment processing is implemented, and recording data thus processed with respect to a recording medium.

A data recording method according to this invention comprises steps of respectively burying cipher key data for implementing encipherment processing to first data consisting of data of contents into delivered plural second data, implementing concealment processing to at least a partial area of the first data on the basis of cipher key data buried in the second data, implementing encode processing to the second data in which contents concealment data is buried and contents data to which conceal processing is implemented, and recording the data thus processed.

A method of reproducing a recording medium adapted so that contents data is recorded by the recording method according to this invention comprises steps of extracting contents concealment data from second data which has been read out from a recording medium adapted so that second data where contents concealment data for concealing contents data is buried is recorded at a position where reproduction is carried out prior to first data in reproducing the first data consisting of contents data, decoding cipher implemented to the first data which has been read out from the recording medium by using this extracted contents concealment data, and outputting the decoded first data subsequently to the second data.

Moreover, a reproducing method for a recording medium according to this invention comprises steps of reading out second data from a recording medium adapted so that first data and second data are recorded, the second data is recorded at a position where reading operation is carried out prior to the first data in reproducing the first data, and the first data is recorded after undergone encipherment processing by using data extracted from the second data, extracting data of a predetermined area of the second data which has been read out, decoding cipher implemented to the first data which has been read out from the recording medium by using the extracted data, and outputting the decoded first data subsequently to the second data.

Further, this invention is directed to a transmitting method for data, and comprises steps of burying contents concealment data for concealing first data consisting of contents data into delivered second data, implementing concealment processing to the first data by using the contents concealment data, implementing encode processing to the second data in which contents concealment data is buried and the contents data to which the concealment processing has been implemented, and transmitting the data thus processed.

In addition, a transmitting method for data according to this invention comprises steps of implementing encipherment processing to first data consisting of contents data by using data which has been extracted from delivered second data, implementing encode processing to the second data and the first data to which encipherment processing has been implemented, and transmitting the data thus processed.

A reproducing method according to this invention comprises steps of extracting contents concealment data from second data of data reproduced prior to first data in reproducing the first data consisting of contents data and including the second data in which contents concealment data for concealing contents data is buried, decoding cipher implemented to the first data by using the extracted contents concealment data, and outputting the decoded first data subsequently to the second data.

Another reproducing method according to this invention comprises steps of extracting data of a predetermined area of second area of data including first data and the second data, the second data being disposed at a position where read-out operation is carried out prior to the first data in reproducing the first data, the first data being caused to undergo encipherment processing by using data which has been extracted from the second data, decoding cipher implemented to the first data by using the extracted data, and outputting the decoded first data subsequently to the second data.

A further reproducing method according to this invention comprises steps of taking second data in which contents concealment data is buried into a reproducing apparatus through network in reproducing, by the reproducing apparatus, first data of a recording medium where the first data consisting of contents data is recorded after undergone encipherment processing on the basis of contents concealment data, extracting the contents concealment data from the second data which has been taken in, decoding cipher implemented to the first data which has been read out from the recording medium by using the extracted contents concealment data, and outputting the decoded first data subsequently to the second data.

Still further objects of this invention and more practical merits obtained by this invention will become more apparent from the description of embodiments which will be given below.

BEST MODE FOR CARRYING OUT THE INVENTION

Embodiments of this invention will now be described in detail with reference to the attached drawings.

(1) Recording Apparatus to which this Invention is Applied

Figure 1:
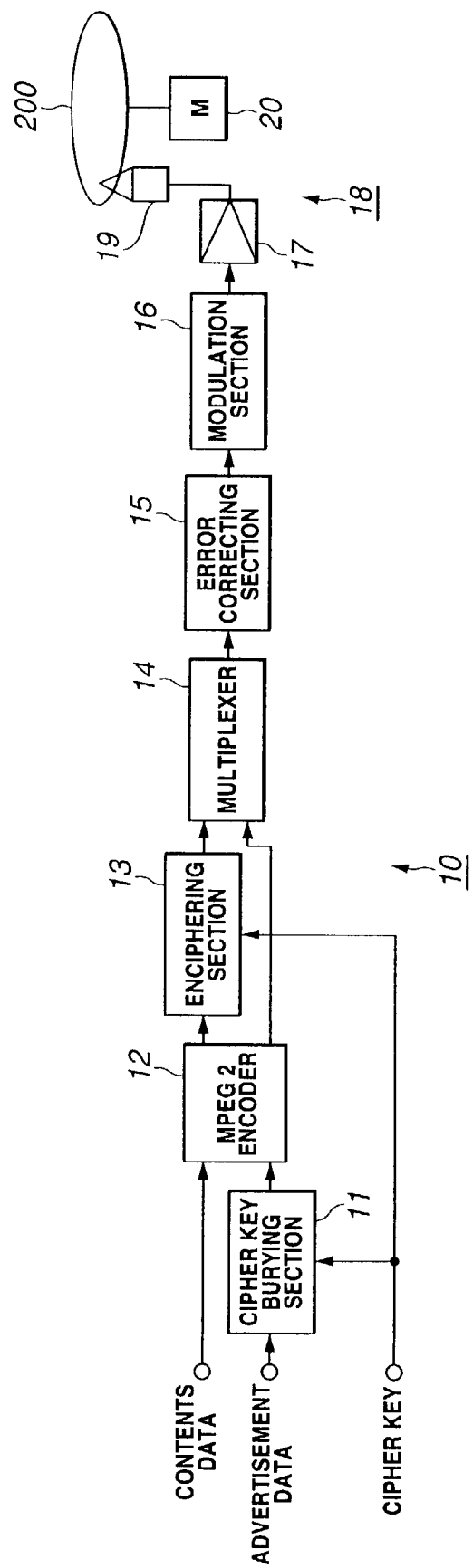
FIG. 1 is a block diagram showing a recording apparatus used in this invention.

The recording apparatus 10 to which this invention is applied includes, as shown in FIG. 1, a cipher key burying section 11 for burying cipher key of contents data into advertisement data which is predetermined data, an encoder 12 for encoding video data, etc. in conformity with MPEG2 (Moving Picture Experts Group 2), an enciphering section 13 for enciphering contents data by cipher key buried in the advertisement data, a multiplexer 14 for carrying out time divisional multiplexing of contents data or advertisement data, an error correcting section 15 for implementing error correction encoding processing to contents data or advertisement data, a modulation section 16 for implementing modulation processing to contents data or advertisement data, and a signal recording section 18 for implementing recording processing for recording contents data or advertisement data to a disc 200. The signal recording section 18 includes, e.g., an optical head 19 and a spindle motor 20, etc.

Figure 2:
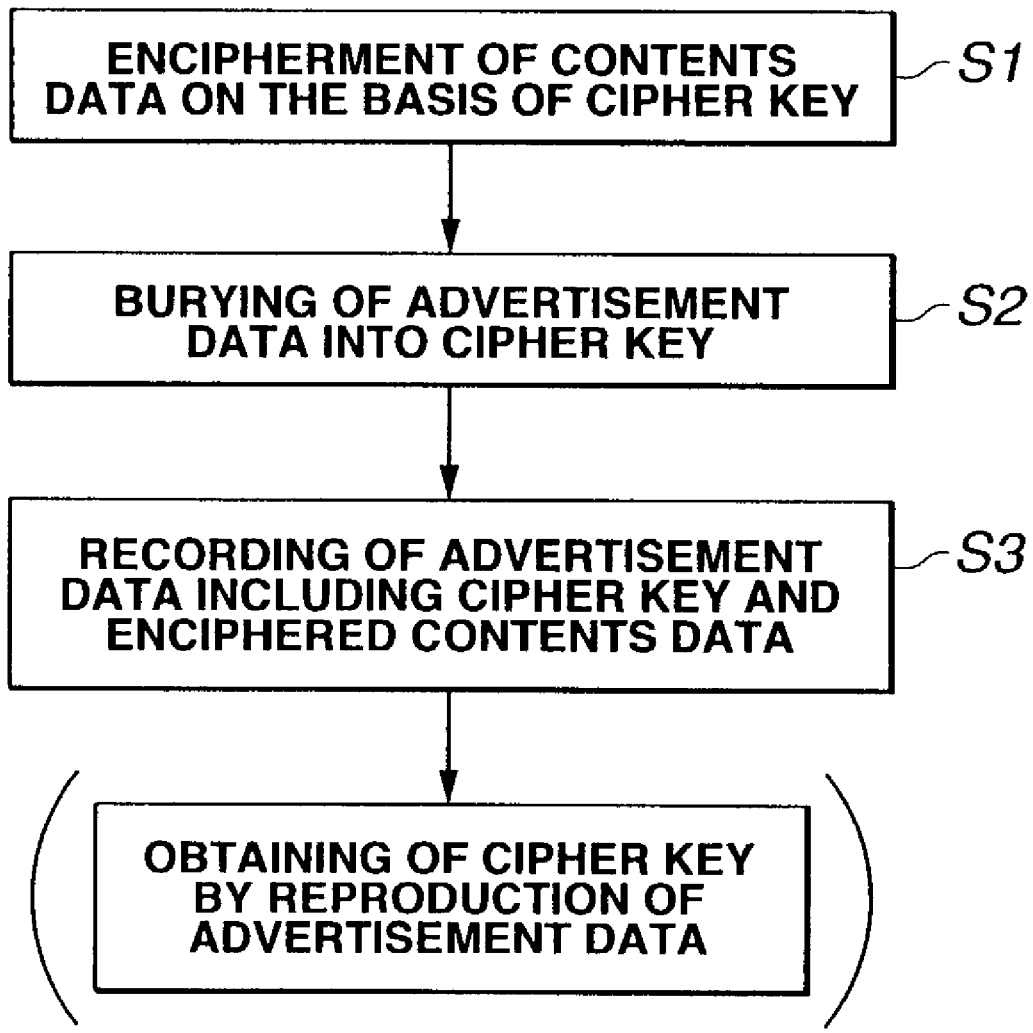
FIG. 2 is a flowchart showing outline of processing procedure in the recording apparatus.

To such recording apparatus 10, contents data, e.g., video data and predetermined data including cipher key serving as contents concealment data for carrying out concealment, e.g., encipherment of this contents data are inputted. The enciphering section 13 serves as concealing means for concealing, e.g., enciphering contents data on the basis of cipher key serving as a portion of advertisement data. Moreover, the multiplexer 14, the error correcting section 15, the modulation section 16, an amplifier 17 and the signal recording section 18 serve as recording means for recording advertisement data including cipher key and enciphered contents data onto, e.g., the disc 200 which is recording medium. The cipher key is extracted as the result of the fact that advertisement is reproduced at the reproducing apparatus. By this cipher key, contents data can be cryptanalyzed This recording apparatus 10 executes processing as shown in FIG. 2. The recording apparatus 10 enciphers contents data on the basis of cipher key at step S1 to bury cipher key into advertisement data at the subsequent step S2 to record the advertisement data including cipher key and the enciphered contents data onto the disc 200. The recording apparatus 10 will be described in detail below.

The contents data is inputted to the MPEG 2 encoder 12 in order to carry out encode operation in conformity with MPEG2. Moreover, the advertisement data which is predetermined data is inputted to the enciphering section 13. Further, cipher key (contents concealment data) for enciphering contents data of video data of movie, etc. is inputted to the cipher key burying section 11 in order to bury cipher key into advertisement data, and is inputted to the enciphering section 13 in order to encipher contents data.

The cipher key burying section 11 carries out processing for burying cipher key into advertisement data. The processing for burying cipher key into advertisement data will be described in detail later. The advertisement data in which cipher key is buried by the cipher key burying section 11 is inputted to the MPEG 22 encoder 12.

The MPEG 2 encoder 12 is an encoder constituted in conformity with standard of MPEG 2 (Moving Picture Experts Group 2), and serves to compress contents data and advertisement data in which cipher key is buried in the time axis direction and in the spatial axis direction to carry out encode processing thereof. The MPEG 2 encoder 12 outputs the contents data which has been caused to undergo encode processing to the enciphering section 13, and outputs the advertisement data which has been caused to undergo encode processing to the multiplexer 14.

The enciphering section 13 enciphers contents data which has been caused to undergo encode processing on the basis of inputted cipher key. The enciphering section 13 outputs the enciphered contents data to the multiplexer 14.

The multiplexer 14 carries out, e.g., time divisional multiplexing of the contents data and the advertisement data in which cipher key is buried. The signal which has been caused to undergo time divisional multiplexing is inputted to the error correcting section 15. The signal which has been caused to undergo time divisional multiplexing is error-corrected at the error correcting section 15. The error-corrected signal thus obtained is caused to undergo modulation processing at the modulation section 16. The signal thus obtained is amplified at the amplifier 17. The optical head 19 records data onto the disc 200 rotationally driven by the spindle motor 20.

In this example, the signal written on the disc 200 consists of advertisement data in which cipher key is buried and contents data (movie data, etc.) enciphered by this cipher key. This recording apparatus 10 records data in a manner to reproduce advertisement data prior to reproduction of contents data enciphered by the reproducing apparatus. For example, in the disc where data is reproduced from the inner circumferential side, advertisement data is recorded at the inner circumferential side and contents data is recorded at the outer circumferential side thereof. Moreover, in the disc where data is reproduced from the outer circumferential side, advertisement data is recorded at the outer circumferential side and contents data is recorded at the inner circumferential side.

In a manner stated above, the recording apparatus 10 as described above can carry out concealment, e.g., encipherment (conversion into decode disable state) of contents data on the basis of cipher key (predetermined data), and bury this cipher key into advertisement data to record, onto the disc 200, contents data and advertisement data so that the advertisement data is reproduced prior to reproduction of the contents data.

While the recording apparatus 10 has the configuration in which MPEG 2 encoder 12 is disposed at the succeeding stage of the cipher key burying section 11, MPEG 2 encoder 12 may be disposed at the preceding stage of the cipher key burying section 11. In this case, burying of cipher key is carried out with respect to encoded advertisement data. In addition, the MPEG 2 encoder 12 may be disposed at the succeeding stage of the enciphering section 13.

While concealment of contents data is carried out by using cipher key in this recording apparatus 10, this invention is not limited to such an implementation. For example, any data conversion processing may be implemented to contents data. In this case, data conversion for concealment of contents data is processing such as scramble implemented to contents data on the basis of concealment data such as predetermined key data, etc. (e.g., line shuffling or mosaic, etc.), disturbance addition (e.g., noise disturbance addition with respect to specific line, etc.), and the like. Namely, concealment of contents data referred to here is conversion into the state where persons except for specific user, i.e., except for user who has correct cipher key cannot normally reproduce contents data, and placement in the state where decoding of contents data is disabled, or the state where viewer is prevented from looking at image or listening to music.

While the multiplexer 14 carries out time divisional multiplexing of contents data and advertisement data in the recording apparatus 10, this invention is not limited to such an approach. For example, contents data and advertisement data may be caused to undergo spatial division. In this case, in demultiplexer of the reproducing apparatus which will be described later, contents data and advertisement data are separated in correspondence therewith.

While explanation has been given by the example of advertisement data as predetermined data caused to be data including cipher key in the above-mentioned example, this invention is not limited to such implementation. For example, when contents data caused to correspond is data in which copyright management is required such as movie, etc., the above-described predetermined data may be also caused to be copyright management information. In this case, the copyright management information is data of copyrighter or management number, etc. of contents data.

Another example of the recording apparatus will now be described. While the above-described recording apparatus 10 is an apparatus for enciphering contents data on the basis of, e.g., cipher key which is not entirely related to advertisement data, a recording apparatus which will be described below is an apparatus adapted to carry out concealment, e.g., encipherment of contents data by using a portion of advertisement data. In this case, a portion of the advertisement data is, e.g., the entirety of a predetermined frame or line data within the predetermined frame, etc. although the detail is described later.

Figure 3:
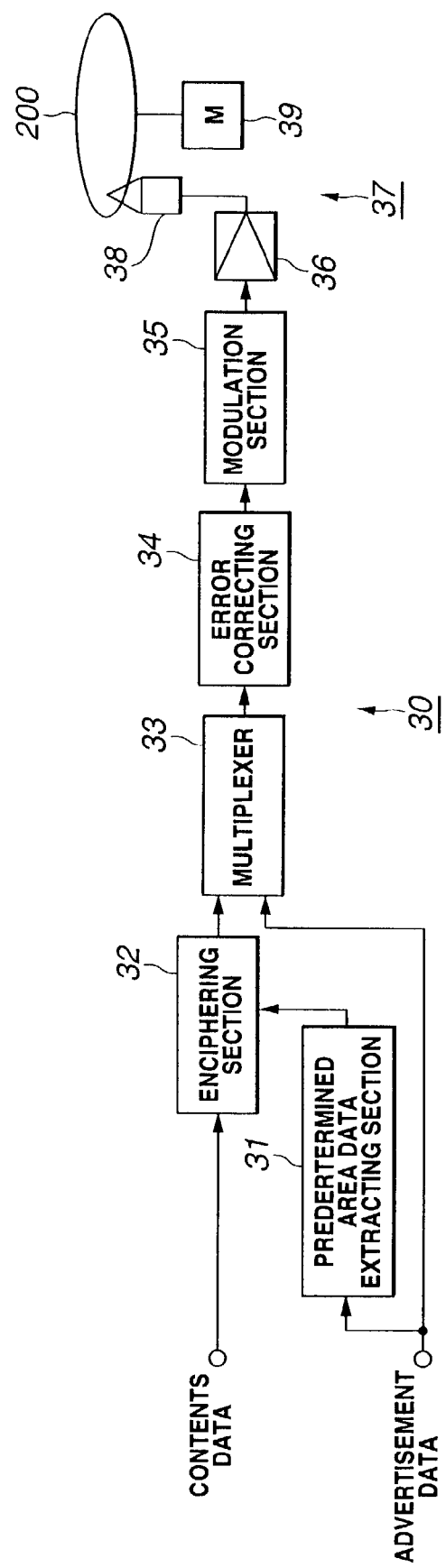
FIG. 3 is a block diagram showing another example of the recording apparatus used in this invention.

This recording apparatus comprises, as shown in FIG. 3, a predetermined area data extracting section 31 for extracting a predetermined area from advertisement data, an enciphering section 32 for enciphering contents data, a multiplexer 33 for carrying out time divisional multiplexing of contents data or advertisement data, an error correcting section 34 for implementing error correction encoding processing to contents data or advertisement data, a modulation section 35 for implementing modulation processing to contents data or advertisement data, an amplifier 36 for amplifying contents data or advertisement data recorded onto the disc 200, and a signal recording section 37 for implementing recording processing for recording contents data or advertisement data onto the disc 200. This recording apparatus 10 has operation similar to the recording apparatus 10 shown in FIG. 1. The fundamental operation is similar to that shown in FIG. 2. However, there is no processing for burying cipher key into advertisement data at step S2. In place of this processing, at step S1, data used for encipherment is extracted from a predetermined area of advertisement data to encipher contents data on the basis of the extracted data. The detail of the recording apparatus 30 will be described below.

This recording apparatus is characterized in that it comprises the predetermined area data extracting section 31. This recording apparatus 30 is adapted to extract data from the predetermined area of advertisement data by this predetermined area data extracting section 31 to input that extracted data (hereinafter referred to as data for encipherment) to the enciphering section 32.

Contents data is inputted to the enciphering section 32. The enciphering section 32 enciphers this contents data on the basis of the data for encipherment extracted at the predetermined area data extracting section 31. This contents data enciphered at the enciphering section 32 is inputted to the multiplexer 33.

The multiplexer 33 is supplied with advertisement data along with the enciphered contents data, and serves to carry out time divisional multiplexing of the advertisement data and the contents data. The data which has been caused to undergo time divisional multiplexing at this multiplexer 33 is processed along the processing procedure similar to that of the above-described recording apparatus 10 at times subsequent thereto. Namely, the data which has been caused to undergo time divisional multiplexing is error-corrected at the error correcting section 34. The error-corrected data thus obtained is caused to undergo modulation processing at the modulation section 35. The modulation-processed data thus obtained is amplified at the amplifier 36. An optical head 38 writes data from the amplifier 36 onto disc 200 rotationally driven by a spindle motor 39.

As described above, this recording apparatus 30 extracts a portion of advertisement data to carry out concealment, e.g., encipherment of contents data, i.e., conversion into the state where decoding cannot be carried out on the basis of that extracted data, e.g., encipherment data to record contents data and advertisement data so that advertisement data is reproduced prior to reproduction of contents data.

It should be noted that the recording apparatus 30 is not limited to the above-described apparatus similarly to the fact that the recording apparatus 10 is not restrictively interpreted as described above.

(2) Reproducing Apparatus to which this Invention is Applied

Figure 4:
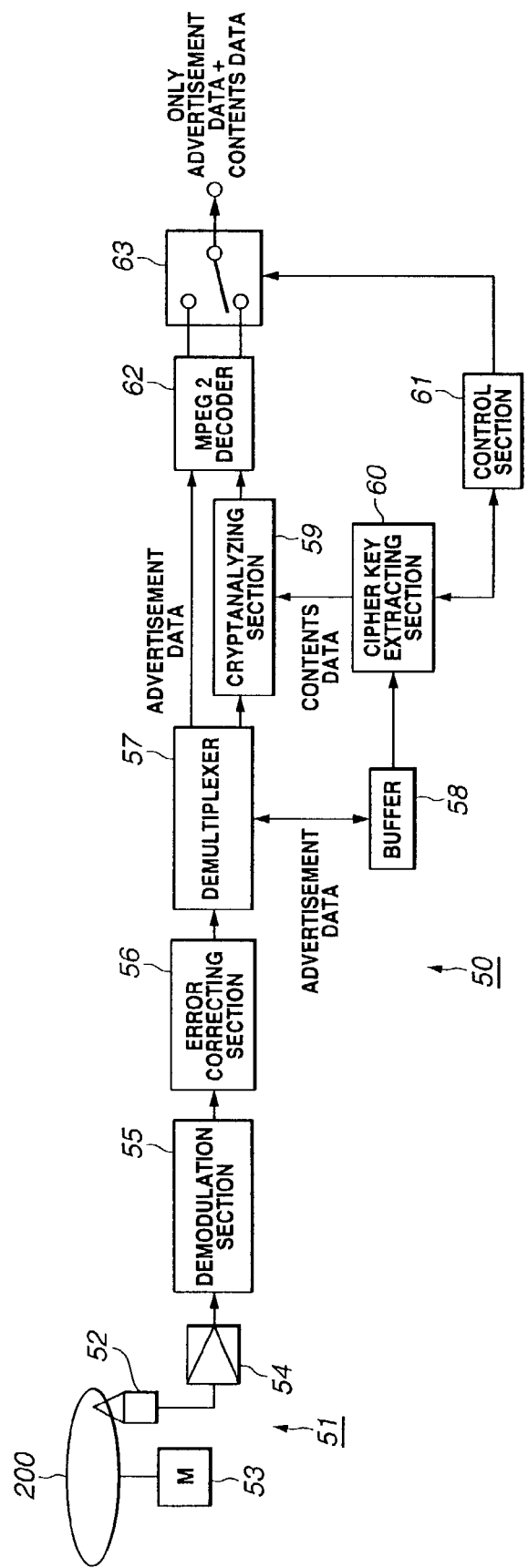
FIG. 4 is a block diagram showing a reproducing apparatus used in this invention.

A reproducing apparatus 50 to which this invention is applied is directed to an apparatus for reproducing disc 200 on which data is recorded by the above-described recording apparatus 10 shown in FIG. 1, and comprises, as shown in FIG. 4, a signal reproducing section 51 for reading out data from the disc 200, an amplifier 54 for amplifying data which has been read out at the signal reproducing section 51 to generate RF signal, etc., a demodulation section 55 for demodulating data inputted from the amplifier 54, an error correcting section 56 for implementing error correcting processing to the demodulated data, a demultiplexer 57 for dividing the signal which has been caused to undergo time divisional multiplexing into advertisement data and contents data, a buffer 58 for temporarily storing advertisement data, a cryptanalyzing section 59 for cryptanalyzing contents data, a cipher key extracting section 60 for extracting cipher from advertisement data, a MPEG 2 decoder 62 for decoding data which has been encoded by MPEG 2, a data output switching section (switch) 63 for carrying out switching of output of data, and a control section 61 for controlling the data output switching section 63. In this example, the signal reproducing section 51 comprises, e.g., an optical head 52 and a spindle motor 53.

Such reproducing apparatus 50 serves to read out enciphered contents data from the disc 200 which is recording medium on which advertisement data including cipher key for carrying out concealment, e.g., encipherment of contents data and enciphered contents data are recorded to reproduce that contents data, and the cipher key extracting section 60 serves as extracting means for reproducing advertisement data prior to reproduction of contents data to extract cipher key. The cryptanalyzing section 59 serves as concealment releasing means for cryptanalyzing contents data enciphered on the basis of cipher key extracted from advertisement data. Further, the MPEG 2 decoder 62, etc. succeeding to the cryptanalyzing section 59 serve as reproducing means for reproducing contents data in which encipherment is released.

Figure 5:
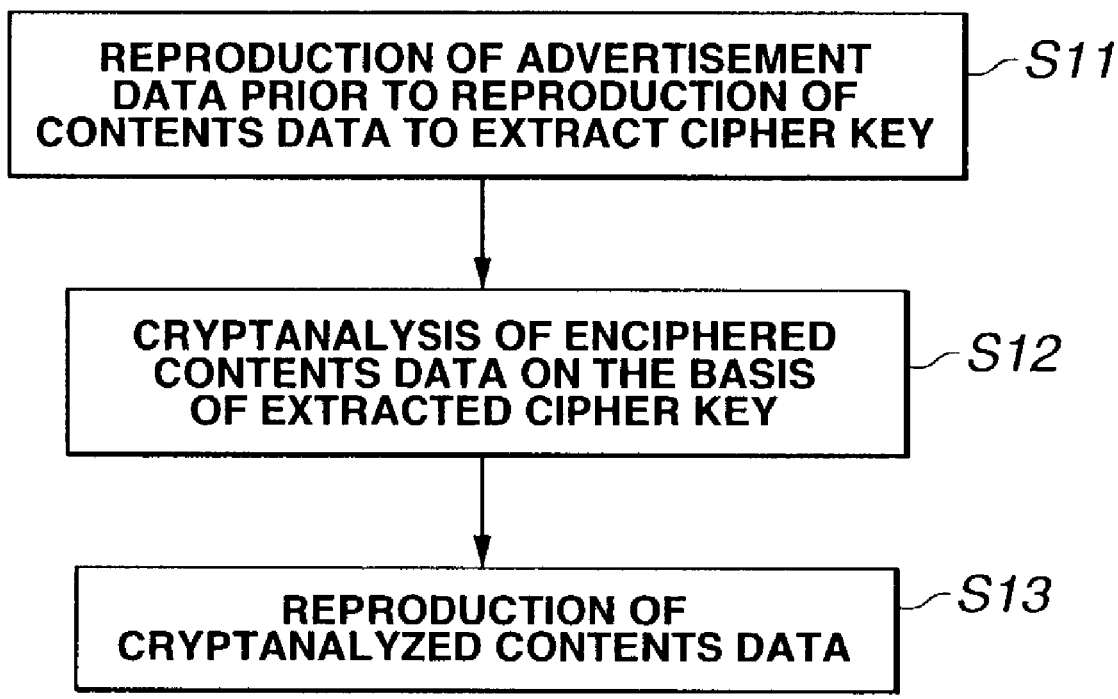
FIG. 5 is a flowchart showing outline of processing procedure in the reproducing apparatus.

This reproducing apparatus 50 executes processing as shown in FIG. 5. Namely, as shown in FIG. 5, the reproducing apparatus 50 reproduces advertisement data prior to contents data to extract cipher key at step S11 to cryptanalyze contents enciphered data on the basis of the extracted cipher key at the subsequent step S12 to reproduce the cryptanalyzed contents data at the subsequent step S13. The detail of the reproducing apparatus 50 will be described below.

The reproducing apparatus 50 reads signal by the optical head 52 from the disc 200 rotationally driven, e.g., at constant linear velocity or constant angular velocity by the spindle motor 53. In this case, the signal which has been read is, e.g., signal which has been caused to undergo time divisional multiplexing, and advertisement data in which cipher key is buried and contents data of movie, etc. enciphered by the cipher key.

The signal outputted from the optical head 52 is caused to undergo amplifying processing at the amplifier 54. The signal thus amplified is caused to undergo decoding processing at the decoding section 55. Further, the signal thus decoded is caused to undergo error correction processing at the error correcting section 56. The signal which has been error-corrected at the error correcting section 56 (the signal which has been caused to undergo time divisional multiplexing) is inputted to the demultiplexer 57.

The demultiplexer 57 divides the inputted signal which has been caused to undergo time divisional multiplexing into advertisement data and contents data. The advertisement data obtained by division at the demultiplexer 57 is inputted to the buffer 58 and the MPEG 2 decoder 62. The contents data obtained by division at the demultiplexer 57 is inputted to the cryptanalyzing section 59. In this example, the contents data inputted to the cryptanalyzing section 59 is enciphered on the basis of cipher key.

The cipher key extracting section 60 extracts cipher key from the advertisement data which has been taken into the buffer 58 to output the extracted cipher key to the cryptanalyzing section 59.

The cryptanalyzing section 59 decodes the enciphered contents data on the basis of the cipher key extracted at the cipher key extracting section 60. The contents data decoded at the cryptanalyzing section 59 is inputted to the MPEG 2 decoder 62.

The MPEG 2 decoder 62 is a decoder constituted in conformity with the standard of MPEG 2 (Moving Picture Experts Group 2), and the contents data is caused to undergo decode processing by the MPEG 2 system at this decoder. In addition, advertisement data obtained by division at the demultiplexer 57 is inputted to the MPEG 2 decoder 62, and the advertisement data is caused to undergo decode processing at the MPEG 2 decoder 62. The contents data and the advertisement data which have been caused to undergo decode processing are inputted to the data output switching section 63.

The data output switching section 63 is controlled by a control section 61 to output, at a predetermined timing, advertisement data from the MPEG 2 decoder 62 to blocks of succeeding stage such as monitor and speaker, etc. Moreover, the data output switching section 63 is controlled by the control section 61 to output, at a predetermined timing, contents data from the MPEG 2 decoder 62 to blocks of succeeding stage such as monitor and speaker, etc. By such control by the control section 61, corresponding advertisement data is outputted in a manner preceding to contents data.

Since when the reproducing apparatus 50 cannot read out advertisement data from the disc 200, this apparatus cannot extract cipher key, it is impossible to cryptanalyze contents data. In addition, also when the reproducing apparatus 50 cannot extract cipher key from advertisement data at the cipher key extracting section 60, it is impossible to cryptanalyze contents data. Accordingly, in such a case, at the reproducing apparatus 50, it becomes impossible to reproduce contents data.

As described above, the reproducing apparatus 50 can extract cipher key buried in advertisement data to cryptanalyze contents data on the basis of that cipher key to thereby reproduce contents data and advertisement data. The reproducing apparatus 50 carries out such reproduction in such a manner that advertisement data from which cipher key is extracted is caused to precede. Thus, the reproducing apparatus 50 permits viewer who desires to compulsorily look at contents data of movie, etc. to look at advertisement data in a preceding manner. Thus, the reproducing apparatus 50 can enhance advertisement effect attached to the contents.

While the reproducing apparatus 50 is adapted so that MPEG 2 decoder 62 is disposed at the succeeding stage of the cryptanalyzing section 59, MPEG 2 decoder 62 may be disposed at the preceding stage of the cryptanalyzing section 59. In more practical sense, the position where the MPEG 2 decoder 62 is disposed is determined in correspondence with the position where MPEG 2 encoder 12 of the above-described recording apparatus 10 is disposed.

While concealment of contents data has been carried out by using cipher key in the above-described reproducing apparatus 50, this invention is not limited to this implementation. For example, concealment of contents data may be carried out by implementing any data conversion processing to contents data. In this case, release of concealment of contents data is release of scramble implemented to contents data (e.g., line shuffling or mosaic, etc.), disturbance addition (e.g., noise disturbance addition with respect to specific line, etc.), or blueback, etc. As described above, concealment of contents data referred to here is conversion into the state where a person except for a specific user, i.e., user who can correctly obtain cipher key cannot normally reproduce contents data, and placement in the state where decoding of contents data is disabled, or the state where viewer is prevented from viewing image or is prevented from listening to music. Release of concealment is release of such state where decoding is disabled or release of such preventing operation.

The demultiplexer 57 divides signal in which contents data and advertisement data are caused to undergo time divisional multiplexing, but is not limited to such impleentation. For example, signal in which contents data and advertisement data are spatially divided may be divided.

Another example of the reproducing apparatus to which this invention is applied will now be applied. While the above-described reproducing apparatus 50 serves to cryptanalyze contents data on the basis of cipher key, a reproducing apparatus 70 which will be described below is caused to be of configuration for cryptanalyzing contents data on the basis of data for encipherment which is a portion of advertisement data.

Figure 6:
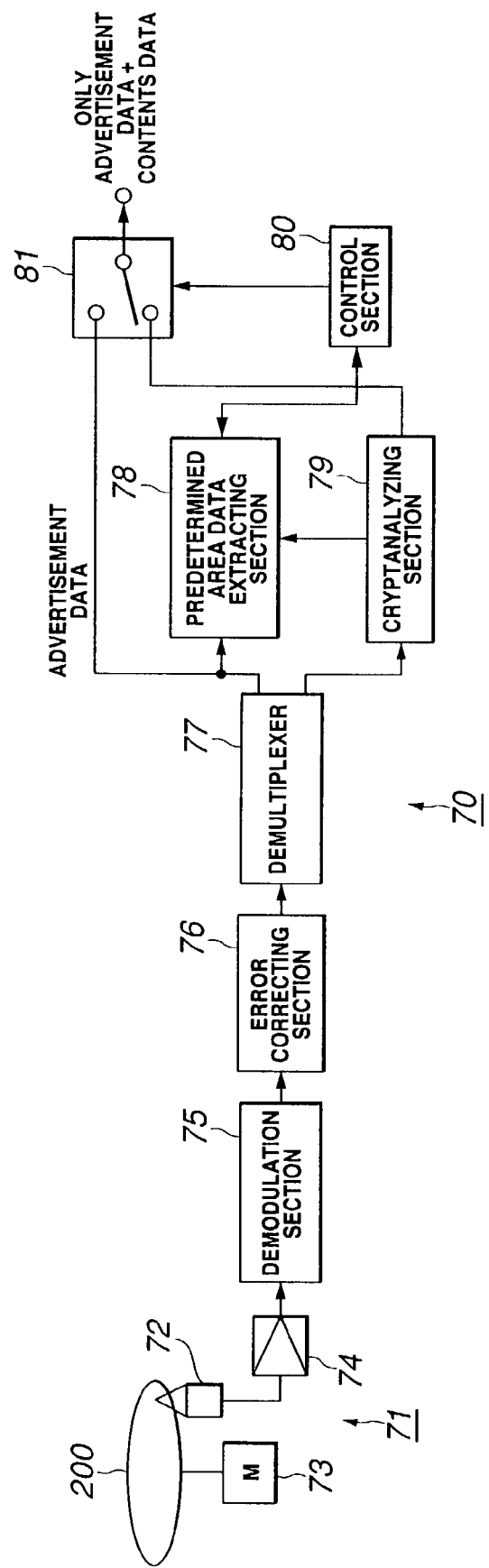
FIG. 6 is a block diagram showing another example of the reproducing apparatus used in this invention.

The reproducing apparatus 70 comprises, as shown in FIG. 6, a signal reproducing section 71 for reading out data from disc 200, an amplifier 74 for amplifying data which has been read out at the signal reproducing section 71 to generate RF signal, etc., a demodulation section 75 for demodulating data which has been inputted from the amplifier 74, an error correcting section 76 for implementing error correcting processing to the demodulated data, a demultiplexer 77 for dividing signal which has been caused to undergo time divisional multiplexing into advertisement data and contents data, a predetermined area data extracting section 78 for extracting a predetermined area used as cipher key from advertisement data, a cryptanalyzing section 79 for cryptanalyzing contents data, a data output switching section (switch) 81 for carrying out switching of data, and a control section 80 for controlling the data output switching section (switch) 81. This reproducing apparatus 70 has operation similar to the reproducing apparatus 50 shown in FIG. 4. Although the fundamental operation is similar to that shown in FIG. 5, encipherment data used for encipherment is extracted from a predetermined area of advertisement data in place of reproducing advertisement data to extract cipher key at step S11, and contents data enciphered on the basis of that extracted encipherment data is cryptanalyzed. The detail of the reproducing apparatus 70 will be described with reference to FIG. 6.

This reproducing apparatus 70 is characterized in that it comprises a predetermined area data extracting section 78 supplied with advertisement data from the demultiplexer 77. The reproducing apparatus 70 serves to extract encipherment data used for encipherment from the predetermined area of advertisement data by this predetermined area data extracting section 78 to output that encipherment data to the cryptanalyzing section 79.

The cryptanalyzing section 79 is supplied with enciphered contents data to cryptanalyze this enciphered contents data on the basis of the encipherment data extracted at the predetermined area data extracting section 78. The contents data which has been cryptanalyzed at this cryptanalyzing section 79 is inputted to the data output switching section 81.

The data output switching section 81 essentially has the same operation as the operation in the case of the above-described reproducing apparatus 50, and is controlled by the control section 80 to output, at a predetermined timing, advertisement data from the demultiplexer 77 to blocks of succeeding stage. The data output switching section 81 is controlled by the control section 80 to output, at a predetermined timing, contents data from the cryptanalyzing section 79 to blocks of succeeding stage. By such control by the control section 80, output of corresponding advertisement data is provided in a manner preceding to contents data.

Since when the reproducing apparatus 70 cannot read out advertisement data from the disc 200, or when it cannot extract encipherment data from advertisement data at the predetermined area data extracting section 78, it is impossible to cryptanalyze contents data, the reproducing apparatus 70 stops reproduction of contents data.

As described above, the reproducing apparatus 70 extracts encipherment data from advertisement data to cryptanalyze contents data on the basis of this extracted encipherment data to thereby have ability to reproduce contents data and advertisement data. The reproducing apparatus 70 carries out such reproduction in such a manner that advertisement data from which encipherment data is extracted is caused to precede. Thus, the reproducing apparatus 70 permits viewer who desires to view contents data (movie, etc.) to compulsorily view advertisement data in a manner of precedence. Thus, effect of advertisement attached to contents becomes valid.

The above-described reproducing apparatus is not limited to the apparatus which has been explained above similarly to the fact that the reproducing apparatus 50 is not restrictively interpreted as described above.

(3) Data for Cipher Key of Advertisement Data Used in Encipherment and Burying of Cipher Key into Advertisement Data, etc Explanation will be given in connection with burying into advertisement data of cipher key which is data independent of advertisement data used for encipherment, or the case where partial data of advertisement data is used as cipher key.

Figure 7:
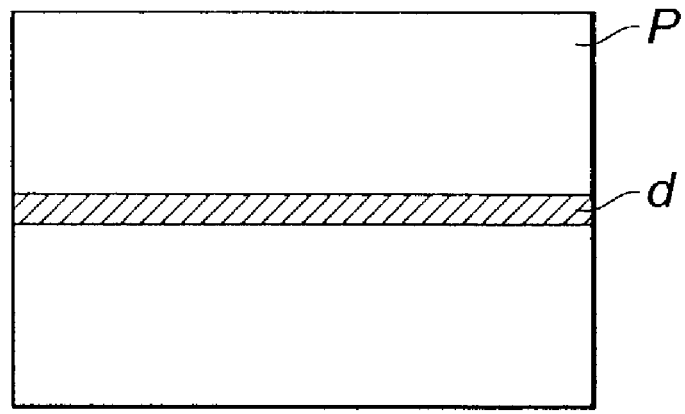
FIG. 7 is a view used for explanation in the case where predetermined line data of picture is caused to be cipher key.

With respect to burying of cipher key into advertisement data in cipher key burying section 11 of the recording apparatus 10 shown in FIG. 1, cipher key d is buried into a predetermined line of predetermined frame picture P of advertisement data as shown in FIG. 7. On the other hand, with respect to extraction of encipherment data from advertisement data in predetermined area extracting section 31 of the recording apparatus 30 shown in FIG. 2, predetermined line data d of predetermined frame picture P of advertisement data as shown in FIG. 7 is extracted as encipherment data as it is. At the reproducing apparatus side, such an approach is employed to extract cipher key in correspondence with such burying of cipher key into advertisement data, or extraction of encipherment data from advertisement data to cryptanalyze contents data, or to extract encipherment data to cryptanalyze contents data.

Figure 8:
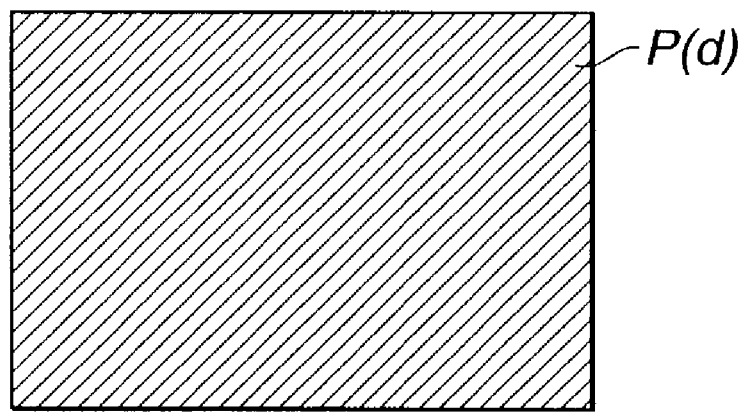
FIG. 8 is a view used for explanation in the case where the entirety of picture of a predetermined frame is caused to be cipher key.

With respect to extraction of encipherment data from advertisement data in predetermined area extracting section 31 of the recording apparatus 30 shown in FIG. 3, data of the entirety of predetermined frame picture P of advertisement data as shown in FIG. 8 is extracted as encipherment data. At the reproducing apparatus side, encipherment data is extracted in correspondence with such extraction of encipherment data from advertisement data to cryptanalyze contents data.

Figure 9:
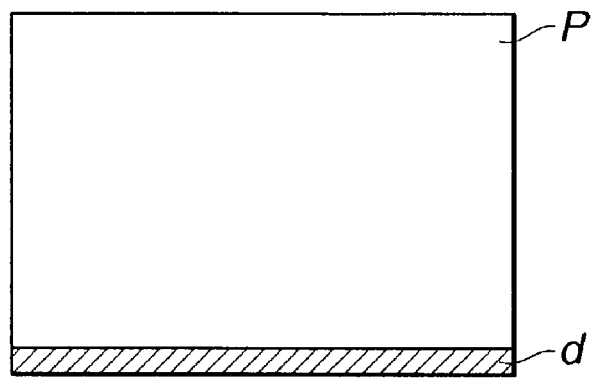
FIG. 9 is a view used for explanation in the case where blanking period in signal of a predetermined frame, i.e., the portion positioned at the outside of display picture is caused to be cipher key.

With respect to burying of cipher key into advertisement data in cipher key burying section 11 of the recording apparatus 10 shown in FIG. 1, cipher key d is buried during blanking period in signal of predetermined frame of advertisement data, i.e., at the portion positioned at the outside of display picture P as shown in FIG. 9. For example, cipher key is buried at the lower side of display picture P as shown in FIG. 9, or cipher key is buried at the upper side of display picture P. At the reproducing apparatus side, such an approach is employed to extract cipher key in correspondence with such burying of cipher key into advertisement data to cryptanalyze contents data.

Figure 10:
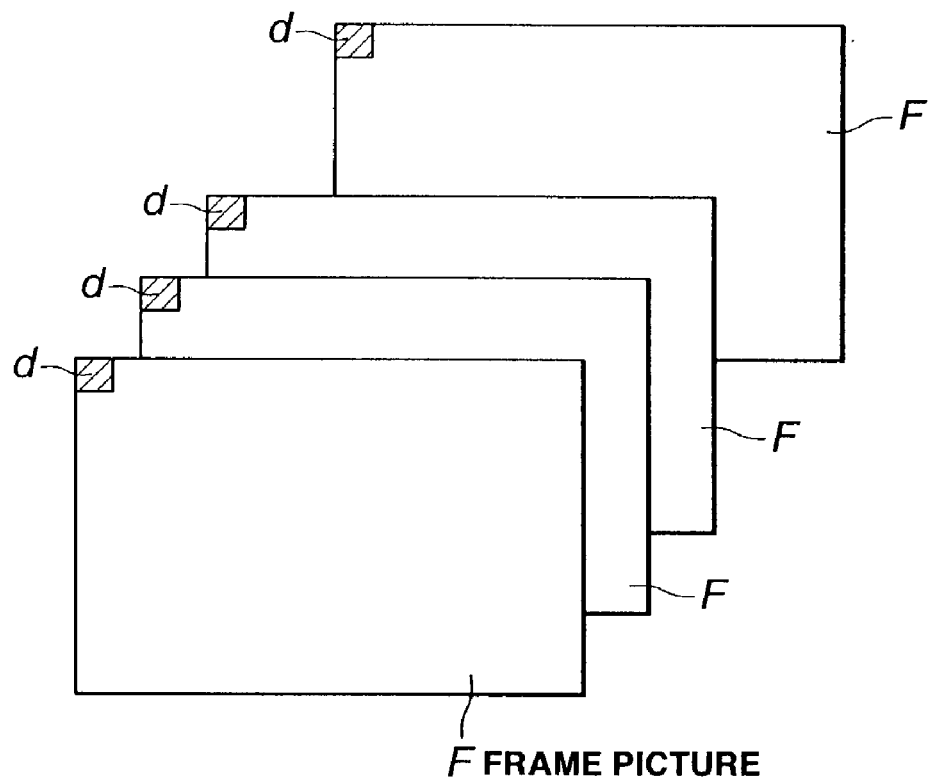
FIG. 10 is a view used for explanation in the case where cipher key is buried at portions of respective frames over all frames.

The cipher key may be also buried over all frames constituting advertisement image as advertisement data. In more practical sense, as shown in FIG. 10, data (portions of cipher key) d are buried into portions of corresponding respective frame pictures F over all frames so that cipher key is generated by acquisition, e.g., addition or accumulation of all data (all of cipher keys) d. Thus, acquisition of cipher key is inhibited because all data d cannot be accumulated, etc. as long as the entirety of advertisement image is not reproduced to have ability to disable cryptanalysis of contents data. Additionally, data d of portions of respective frame pictures F may be caused to be encipherment data over all frames constituting advertisement image.

If such burying of cipher key is employed, viewer cannot look at contents data as long as the entirety of advertisement image is not reproduced. For example, when cipher key is buried into only partial frame, if only frame is reproduced, cryptanalysis of main part (compilation) is carried out so that viewer can look at the entirety of main part (compilation). However, such an approach is employed to bury cipher keys by portions over all frames constituting advertisement image, whereby cipher key is not generated as long as the entirety of advertisement image is reproduced so that the main part (compilation) cannot be cryptanalyzed. As stated above, by employing reproduction of the entirety of advertisement image as a premise in order to look at contents data, the advertisement effect can be improved.

In addition, when cipher keys are buried over frames in a manner stated above, cipher key may be buried into frame of 20 seconds with respect to advertisement image of a predetermined time, e.g., 30 seconds. Thus, viewer looks at advertisement image by a predetermined time to thereby have ability to look at the main part (compilation).

Figure 11:
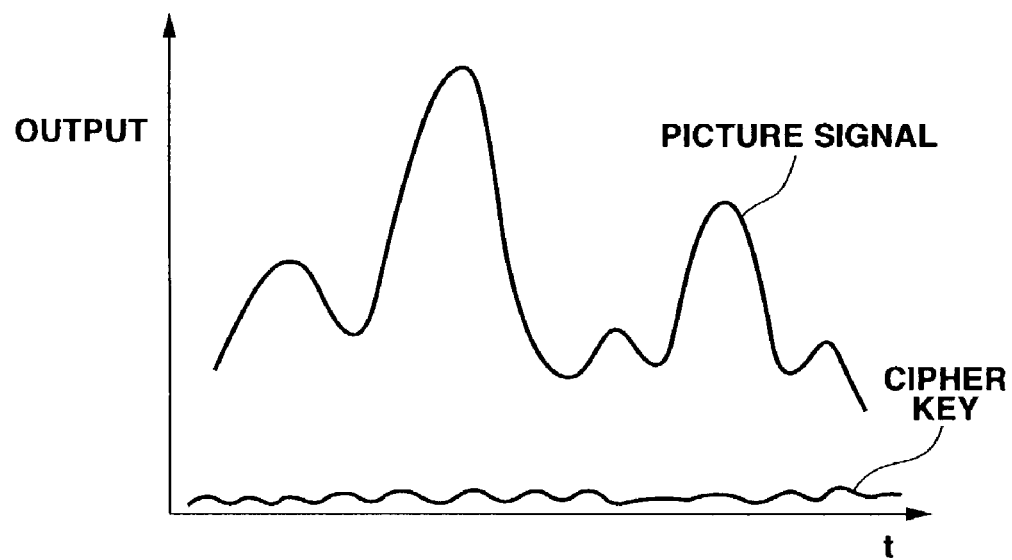
FIG. 11 is a view used for explanation in the case where cipher key is buried by watermark.

As shown in FIG. 11, cipher key can be buried into low order data in picture signal. As such burying of data into low order data of picture signal, there is mentioned data burying technology by electronic watermark (watermark). The watermark is electronic watermark in which, e.g., copy management information standardized by the so-called SDMI (Secure Digital Music Initiative).

Figure 12:
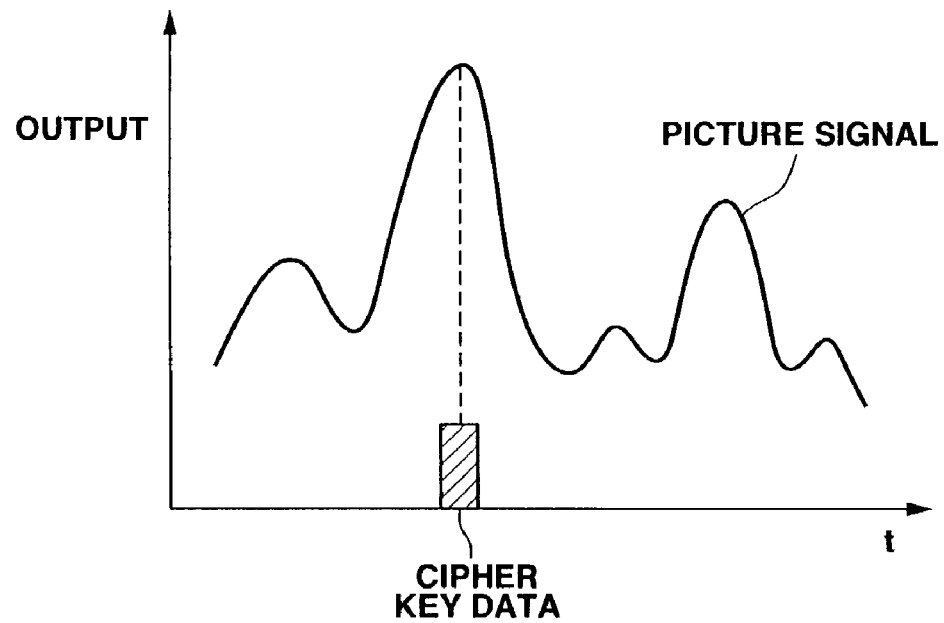
FIG. 12 is a view used for explanation in the case where data of cipher key is buried at peak position of picture signal.

As shown in FIG. 12, data of cipher key may be also buried into the peak position of picture signal. On the other hand, lower order data of peak value of picture signal may be also extracted to use such data as encipherment data. For example, peak value of picture signal is peak value of luminance signal.

The cipher key may be also buried into picture signal by spectrum diffusion.

While burying into advertisement data of cipher key (data independent of advertisement data) used in encipherment or encipherment data which is partial data of advertisement data is determined in a manner stated above, it is needless to say that this invention is not limited to example as described above.

(4) Example where Plural Advertisement Data are Used

Figure 13:
FIG. 13 is a view showing data form consisting of plural advertisement data and plural contents data corresponding thereto.

In the above-described recording apparatuses 10, 30 and reproducing apparatuses 50, 70, the case where one contents data corresponds to advertisement data as one cipher key has been described as an example. For example, as in data form as shown in FIG. 13, there is the case where plural contents data A, B, C, ... are caused to correspond to plural advertisements 1, 2, 3, 4, .... While such data form is form caused to correspond to the serial system, this invention is not limited to this data form. As data form, there may be employed form caused to correspond to the parallel system.

One contents data may be caused to correspond to plural advertisement data (plural cipher keys or plural encipherment data) as object to be enciphered. While encipherment and cryptanalysis of contents data A carried out on the basis of plural cipher keys (data independent of advertisement data) will be described in the following explanation, partial data of advertisement data may be also used as encipherment data so that encipherment and cryptanalysis of contents data A can be carried out. Encipherment and cryptanalysis of contents data A carried out on the basis of plural cipher keys will be carried out as described below in more practical sense.

Figure 14:
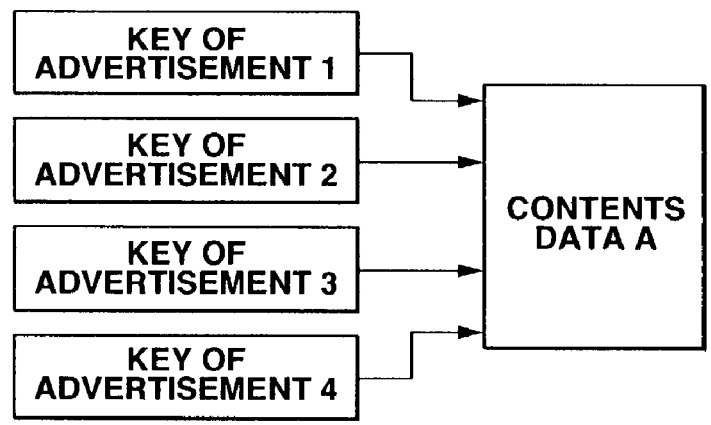
FIG. 14 is a view used for explanation in the case where contents data is enciphered on the basis of cipher keys of plural advertisement data.

For example, as shown in FIG. 14, one cipher key or plural cipher keys buried in four advertisement data of advertisements 1 to 4 are used to encipher contents data. For example, the same cipher keys are buried into advertisements 1 to 4 to reproduce any one of the advertisements 1 to 4 to thereby acquire cipher key. Thus, the reproducing apparatus reproduces any one of advertisements 1 to 4 to thereby have ability to cryptanalyze contents data A to reproduce it.

Such an approach may be also employed to bury cipher keys for enciphering contents data A in a manner distributed into advertisements 1 to 4 to reproduce all of the advertisements 1 to 4 to acquire cipher key. Thus, the reproducing apparatus makes it possible to only reproduce all of advertisements 1 to 4 to acquire cipher key to cryptanalyze contents data A to reproduce it.

Figure 15:
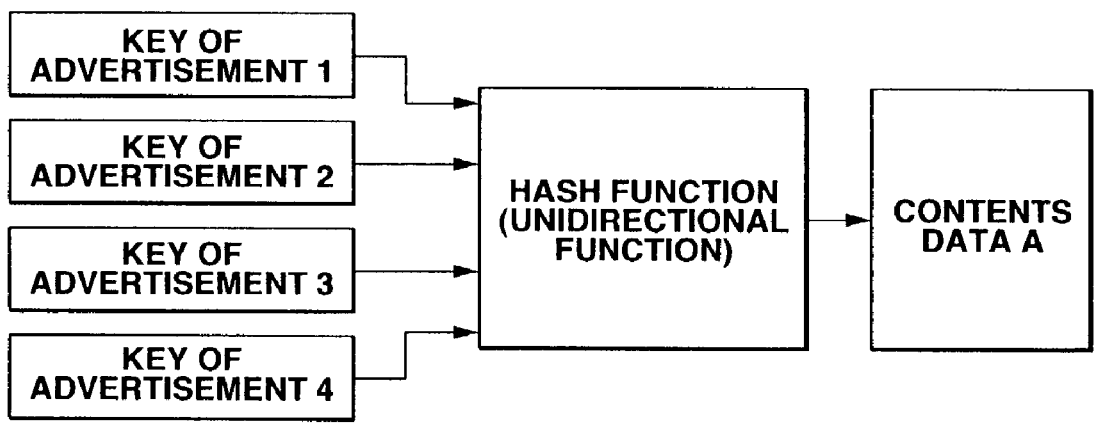
FIG. 15 is a view used for explanation in the case where one cipher key is generated from cipher keys of plural advertisement data, and contents data is enciphered on the basis of one cipher key.

For example, such an approach may be also employed to first generate one cipher key by using cipher keys buried in plural advertisement data to encipher contents data by one cipher key thus generated. In more practical sense, as shown in FIG. 15, cipher keys buried in four advertisement data of advertisements 1 to 4 are used to generate one cipher key by Hash function which is unidirectional function to cryptanalyze contents data A on the basis of that cipher key.

Figure 16:
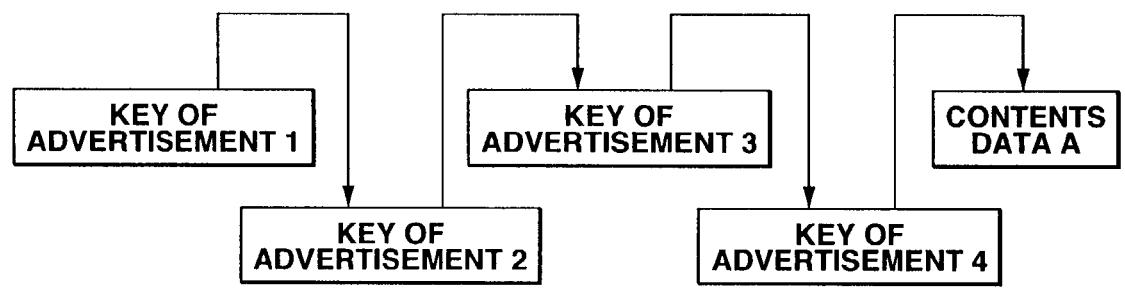
FIG. 16 is a view used for explanation in the case where advertisement data are enciphered on the basis of cipher key, and contents data is enciphered.

Advertisement data itself may be enciphered on the basis of cipher key of another advertisement data. When explanation is given in connection with, e.g., the case of cryptanalysis, advertisement data of advertisement 2 is cryptanalyzed on the basis of cipher key buried in advertisement data of advertisement 1 as shown in FIG. 16. Thus, it is possible to obtain cipher key used for cryptanalysis of advertisement data of advertisement 3 from the advertisement data of advertisement 2. Advertisement data of advertisement 3 is cryptanalyzed on the basis of cipher key obtained from the advertisement data of advertisement 2 to obtain cipher key used for cryptanalysis of advertisement data of advertisement 4. Then, cryptanalysis of contents data A is carried out by cipher key (cipher key for contents data A) obtained by cryptanalyzing the advertisement data of advertisement 4 on the basis of cipher key for cryptanalysis of the advertisement data of advertisement 4. By permitting advertisement data to be cryptanalyzed in a manner of the so-called chain system as described above, it becomes possible to realize the state where contents data A cannot be seen unless reproduction is necessarily carried out in order of advertisement 1 to advertisement 4. Encipherment of advertisement data and contents data A in such a case is realized by the procedure opposite to the above. Namely, it is sufficient to bury cipher key used for encipherment for contents data A into advertisement data of advertisement 4 to encipher it to bury cipher key used for encipherment of advertisement data of advertisement 4 into advertisement data of advertisement 3 to encipher it to bury cipher key used in encipherment of advertisement data of advertisement 3 into advertisement data of advertisement 2 to encipher it to bury cipher key used for encipherment of advertisement data of advertisement 2 into advertisement data of advertisement 1.

Figure 17:
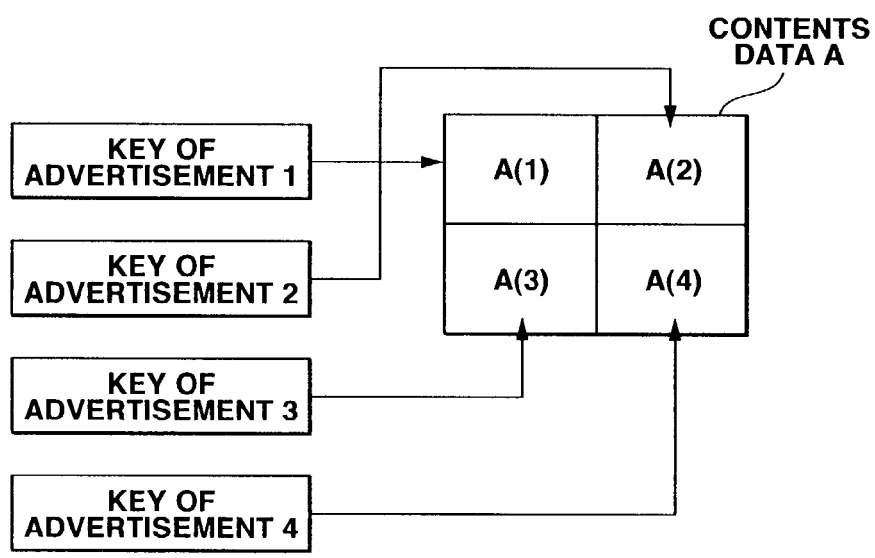
FIG. 17 is a view used for explanation in the case where contents data is partially enciphered in the state caused to correspond to respective cipher keys of plural advertisement data.

Picture images may be partially enciphered by respective cipher keys buried in plural advertisement data. In more practical sense, as shown in FIG. 17, corresponding areas A(1) to A(4) of quadrisected contents data A are enciphered by cipher keys buried in respective advertisement data of advertisements 1 to 4.

By employing such an approach, as long as all advertisement data are not reproduced, i.e., as long as all cipher keys are not acquired, it is possible to inhibit display of all pictures of contents data A. Namely, in the case where advertisement data of advertisement 1 is only reproduced, only a partial area (1) of contents data A is reproduced (cryptanalyzed).

(5) Example of Application to Display of Website of Internet

Figure 18:
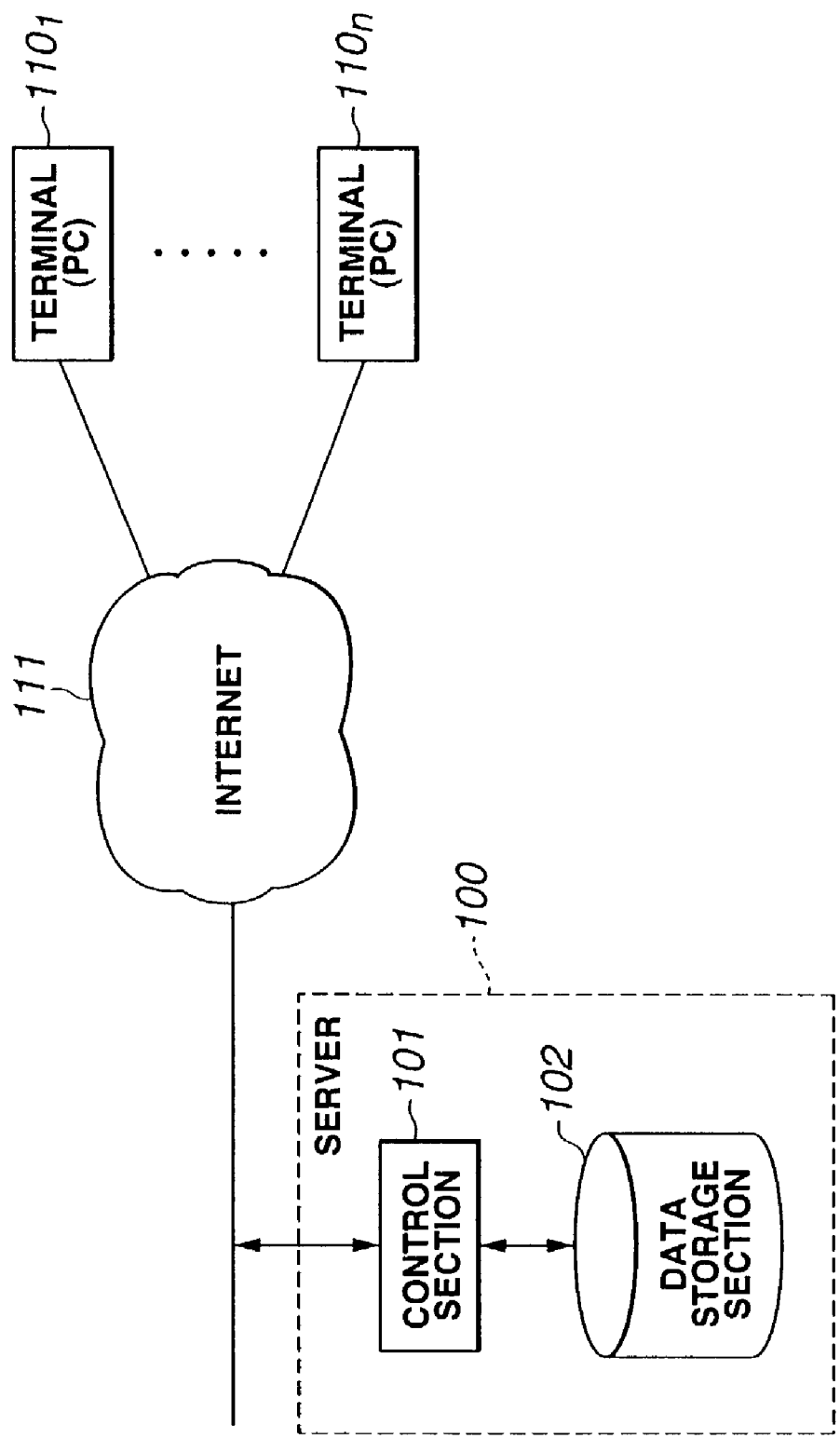
FIG. 18 is a view showing network system constructed by general internet.

While it has been described that contents data and advertisement data have been explained as object to be displayed in connection with the above-described recording apparatuses 10, 30 and reproducing apparatuses 50, 70, this invention can be also applied to display of website of the so-called internet. For example, in the network system utilizing internet, as shown in FIG. 18, a server unit 100 and plural terminal equipments 1101 to 110$n$ such as personal computer (PC), etc. are connected through an internet 111.

In this example, the server unit 100 comprises a control section 101 and a data storage section 102. The data storage section 102 is comprised of large memory capacity hard disc drive, etc. In this data storage section 102, there are stored data for carrying out transmission/reception of data through network (e.g., internet 111), e.g., display data or audio data, etc. constituting website transmitted in accordance with request signal from terminal equipments 1101 to 110$n$. Namely, in the data storage section 102, there are stored display data of Banner advertisement which is advertisement of contents data, advertisement data reproduced when Banner advertisement is operated (clicked) and/or contents data, etc.

The server unit 100 transmits display data, etc. constituting website of a predetermined URL in accordance with access requests from terminal equipments 1101 to 110n. The terminal equipments 1101 to 110n are operative so that when these equipments receive data transmitted from the server unit 100, they display display data on display unit such as CRT (Cathode Ray Tube) or LCD (Liquid Crystal Display), etc.

Figure 19:
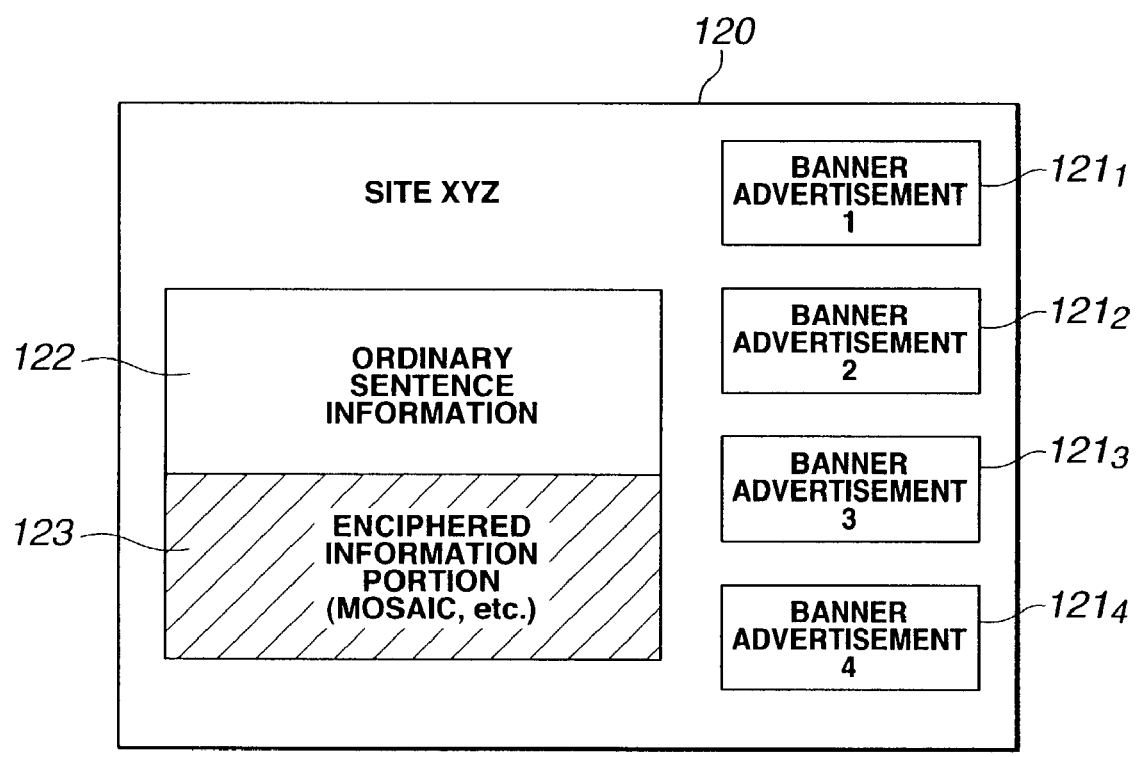
FIG. 19 is a view showing display picture of website permitted as the result of the fact that this invention is applied.

For example, FIG. 19 shows website picture 120 transmitted from the server unit 100 to terminal equipments 1101 to 110n. The server unit 100 transmits display data for displaying picture 120, etc. with respect to access request from the terminal equipments 1101 to 110n in accordance with control of the control section 101.

Figure 20:
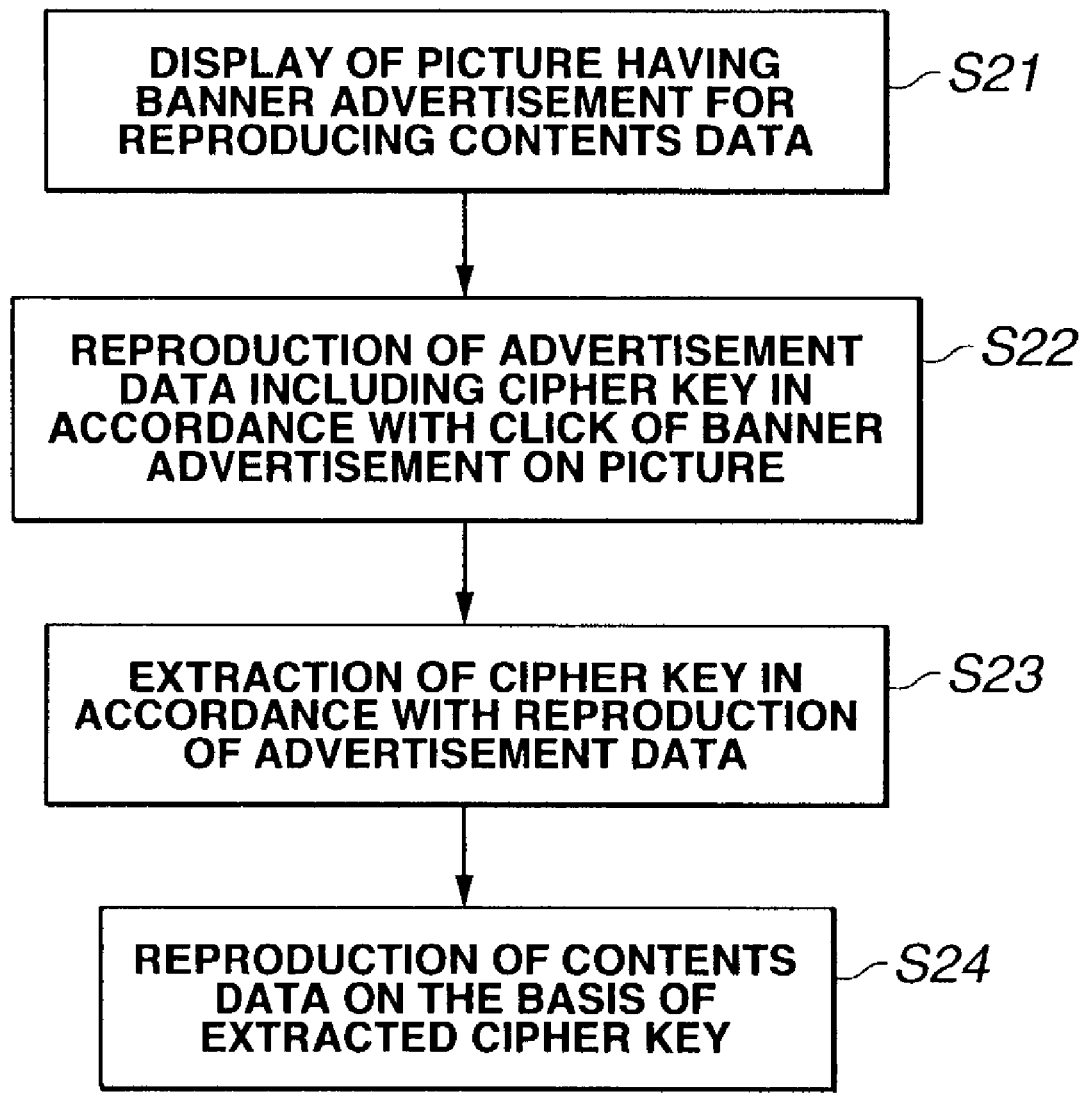
FIG. 20 is a flowchart showing display procedure of website.

As shown in FIG. 20, the terminal equipments 1101 to 110n display picture including Banner advertisement for reproducing contents data at step S21 to reproduce advertisement data including cipher key in accordance with operation (click) of Banner advertisement on picture at the subsequent step S22 to extract the ciper key in accordance with reproduction of advertisement data at the subsequent step S23 to reproduce contents data on the basis of the extracted cipher key at the subsequent step S24. The detail will be described below.

On picture 120 of this site XYZ (tentative name of website), as shown in FIG. 19, there are displayed an ordinary sentence information portion 122 and an enciphered information portion 123. The enciphered information portion 123 provides information which cannot be passed over for a person who looks at this website, and is concealed, e.g., enciphered by cipher key (encipherment data) in ordinary state. For example, the enciphered information portion 123 is placed in the state where mosaic, etc. is applied or is caused to be background picture (blue, etc.), etc. The ordinary sentence information portion 122 is adapted so that it can be read in ordinary state.

On the picture 120 of the cite XYX, Banner advertisements are displayed at the end side of the picture. On the picture 120, there are displayed four Banner advertisements such as Banner advertisement 1 (1211), Banner advertisement 2 (1212), Banner advertisement 3 (1213), and Banner advertisement 4 (1214).

When Banner advertisement is clicked in the case where such picture display is carried out, advertisement data is displayed (reproduced), and extraction of cipher key is carried out in accordance with display (reproduction) of advertisement data. For example, display of advertisement data is carried out by display with respect to a portion of picture, or is carried out by new picture onto picture of this site XYZ. On the basis of cipher key extracted in accordance with display of such advertisement data, mosaic, etc. applied to the enciphered information portion (contents data) 123 is released. In more practical sense, there is employed an approach such that mosaic applied to the enciphered information portion 123 is not released as long as four all Banner advertisements are not clicked, or there is employed an approach such that mosaic applied to the enciphered information portion 123 is partially released in correspondence with click operations of respective Banner advertisements.

Figure 21:
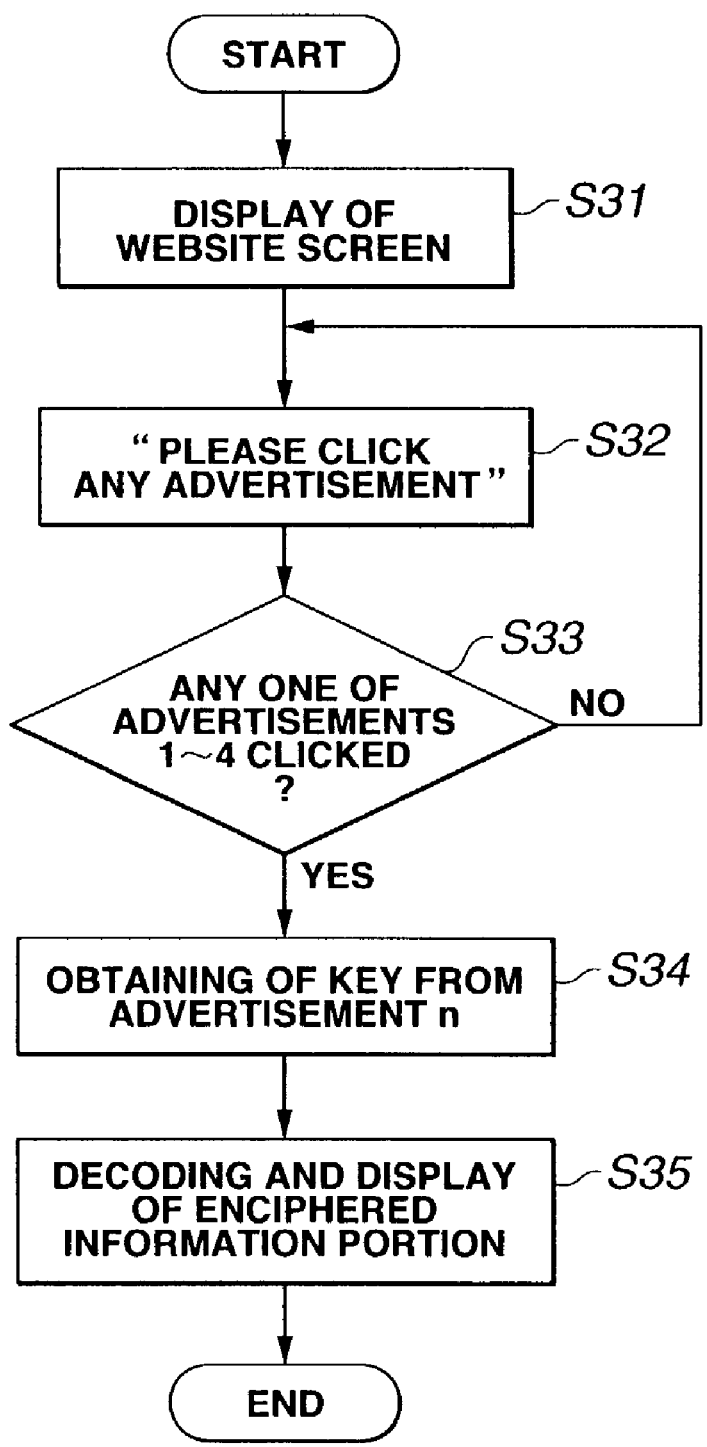
FIG. 21 is a flowchart showing processing procedure from display of website to decoding and display of enciphered portion.

The terminal equipments 1101 to 110n decode cipher of the enciphered information portion 123 as shown in FIG. 21, i.e., FIG. 21 shows more practical processing procedure until mosaic, etc. is released. Here, the example where mosaic, etc. of enciphered information portion 123 is released when at least one Banner advertisement is selected will be described.

At step S31, at terminal equipments 1101 to 110n, display of the website screen is carried out. At the subsequent step S32, the terminal equipments 1101 to 110n carry out display for hastening or promoting selection of Banner advertisement, e.g., "Please click any advertisement". At step S33, the terminal equipments 1101 to 110n carry out discrimination as to whether or not Banner advertisement is selected. At this step S33, the terminal equipments 1101 to 110n continue display indicating "Please click any advertisement" as the processing of the step S32 until any one of advertisements 1 to 4 is clicked. When any one of advertisements 1 to 4 is clicked, processing by the terminal equipments 1101 to 110n proceed to step S34.

The terminal equipments 1101 to 110n obtain (extract) cipher key from the clicked advertisement (n) at the step S34, and decode the enciphered information portion 123 on the basis of the obtained cipher key to display it at the subsequent step S35. It is to be noted that while where is employed such an approach to reproduce advertisement data in correspondence with click of Banner advertisement thereafter to reproduce (decode) the enciphered information portion 123, there may be also employed an approach to immediately reproduce the enciphered information portion 123 only by click of Banner advertisement.

(6) Other Example

The reproducing apparatus may be also caused to be of configuration in which there is provided a section for detecting variable speed reproduction or skip reproduction of advertisement data, whereby when variable speed reproduction or skip reproduction is detected at the detecting section, execution of cryptanalysis based on cipher key is inhibited. The configuration that the reproducing apparatus has in order to realize such a processing is shown in FIG. 22.

Figure 22:
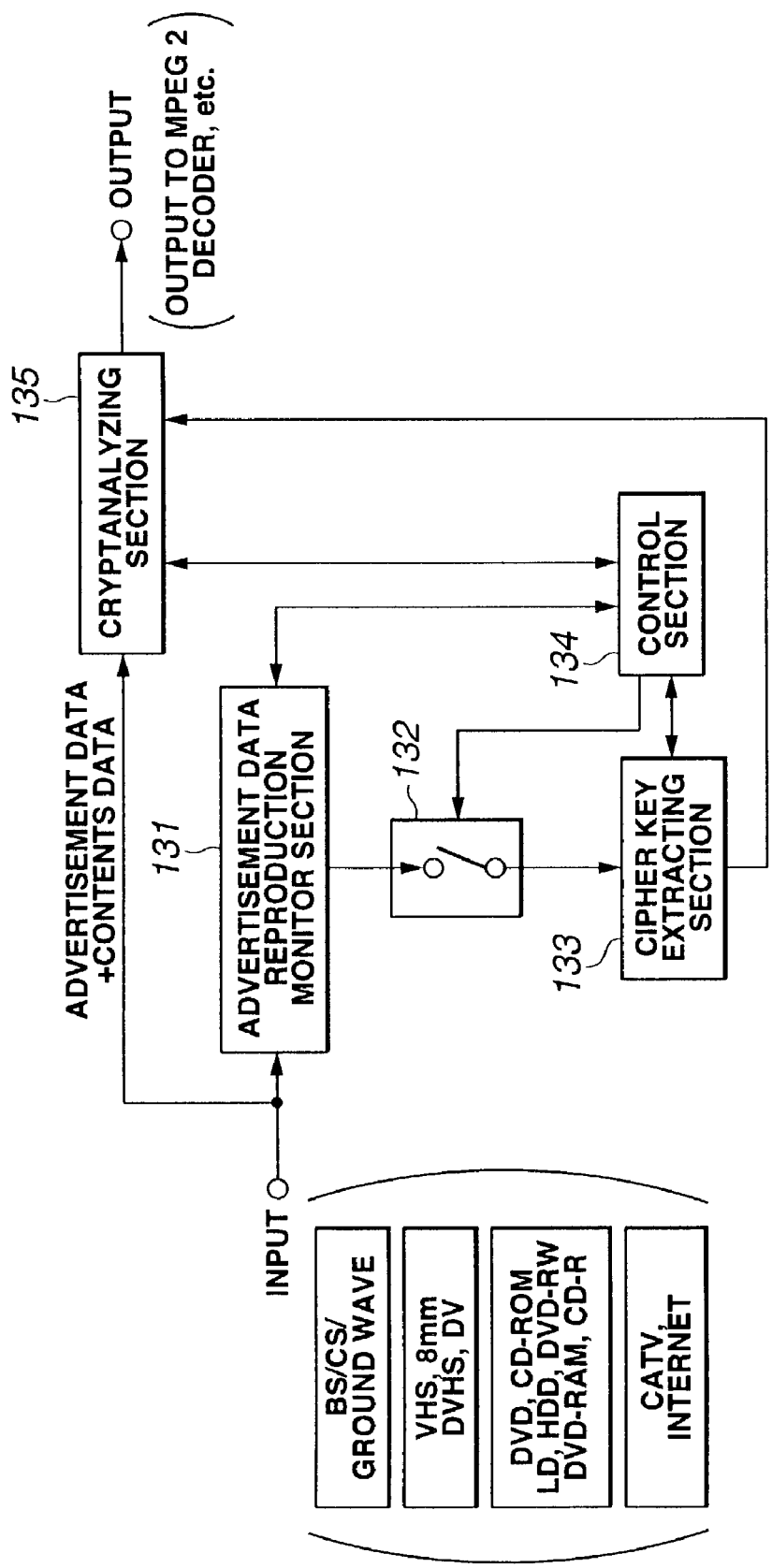
FIG. 22 is a block diagram showing the configuration of a reproducing apparatus adapted for inhibiting execution of cryptanalysis based on cipher key when variable speed reproduction or skip reproduction is detected.

The reproducing apparatus comprises, as shown in FIG. 22, an advertisement data reproduction monitor section 131 for discriminating whether or not advertisement data is normally reproduced, a cipher key extracting section 133 for extracting cipher key from advertisement data, a switch 132 for outputting advertisement data to the cipher key extracting section 133 only when advertisement data is normally reproduced, a control section 134 for controlling switching of the switch 132, and a cryptanalyzing section 135 for releasing encipherment of contents data. For example, when compared with the reproducing apparatus 50 shown in FIG. 4, the advertisement data reproduction monitor section 131 and the switch serve as new component. In this example, the control section 134 has new control function caused to be in correspondence with such new components. While the case where contents data is enciphered on the basis of cipher key will be described as an example in the following example, this invention can be also applied to the case where contents data is enciphered on the basis of encipherment data which is caused to be a portion of advertisement data.

The reproducing apparatus having the configuration as shown in FIG. 22 is supplied with data consisting of advertisement data in which cipher key is buried and contents data enciphered by the cipher key, and the advertisement data is inputted to the advertisement data reproduction monitor section 131 and the cryptanalyzing section 135. The cryptanalyzing section 135 is also supplied with corresponding contents data along with advertisement data.

The advertisement data reproduction monitor section 131 monitors reproduction of inputted advertisement data. This advertisement data reproduction monitor section 131 detects as to whether reproduction such that advertisement data cannot exhibit advertisement effect, e.g., variable speed reproduction or skip reproduction, etc. (hereinafter referred to as special reproduction) is carried out or not. The detection result is outputted to the control section 134. The reproduction monitor section 131 is adapted so that in the case where, e.g., high speed reproduction button or button for skip reproduction (not shown) also provided in the reproducing apparatus is operated so that speed of inputted advertisement data is higher than transfer speed at the time of ordinary reproduction processing, or advertisement data cannot be successively obtained, this section detects that advertisement data has been caused to undergo special reproduction.

The control section 134 controls respective components. This control section 134 controls switching of ON/OFF of the switch 132 in accordance with detection result of the advertisement data reproduction monitor section 131. In this example, the switch 132 carries out ON/OFF of connection between the advertisement data reproduction monitor section 131 and the cipher key extracting section 133.

The control section 134 is operative so that when reproduction of advertisement data is not special reproduction but is caused to be ordinary reproduction from detection result of the advertisement data reproduction monitor section 131, it turns the switch 132 ON so that advertisement data is outputted from the advertisement data reproduction monitor section 131 to the cipher key extracting section 133. The control section 134 is operative so that when advertisement data is caused to undergo special reproduction, it turns the switch OFF to inhibit output of advertisement data from the advertisement data reproduction monitor section 131 to the cipher key extracting section 133.

The cipher key extracting section 133 serves to extract cipher key buried in advertisement data. However, when advertisement data is caused to undergo special reproduction such as variable speed reproduction or skip reproduction, etc., input of advertisement data from the advertisement data reproduction monitor section 131 is lost, and extraction of cipher key cannot be carried out. This is the same as processing to break cipher key when advertisement data is caused to undergo special reproduction. Thus, the cryptanalyzing section 135 which carries out cryptanalysis of contents data by cipher key extracted by the cipher key extracting section 133 stops cryptanalysis processing of contents data and reproduction processing of contents data because cryptanalysis of contents data becomes impossible when advertisement data is caused to undergo special reproduction. In such cases that cryptanalysis of contents data cannot be carried out as the result of the fact that advertisement data is caused to undergo special reproduction, such an approach may be also employed to carry out warning display of that effect, e.g., "Since wrong operation has been carried out, processing is completed", etc. on monitor to draw attention to user.

On the other hand, when advertisement data is caused to undergo ordinary reproduction, the cipher key extracting section 133 can extract cipher key from advertisement data, and the cryptanalyzing section 135 can cryptanalyze contents data on the basis of that cipher key. Accordingly, when advertisement data is caused to undergo ordinary reproduction, contents data is outputted to MPEG 2 decoder of the succeeding stage, etc. in the cryptanalyzed state.

As stated above, the reproducing apparatus is adapted so that when advertisement data experiences special reproduction, e.g., variable speed reproduction such as fast feed reproduction, etc. or skip reproduction, etc., extraction of cipher key is disabled from advertisement data so that cryptanalysis of contents data based on cipher key cannot be carried out. Thus, the reproducing apparatus can require viewer to look at advertisement by ordinary reproduction in order to look at the main part (compilation). Thus, the advertisement effect can be improved.

While extraction of cipher key is caused to become impossible when special reproduction is carried out so that cryptanalysis of contents data is caused to be impossible in the above-described example, there by be employed an approach such that prevention of viewing of contents data such as blue picture (e.g., blueback) or while noise, etc. is realized.

Figure 23:
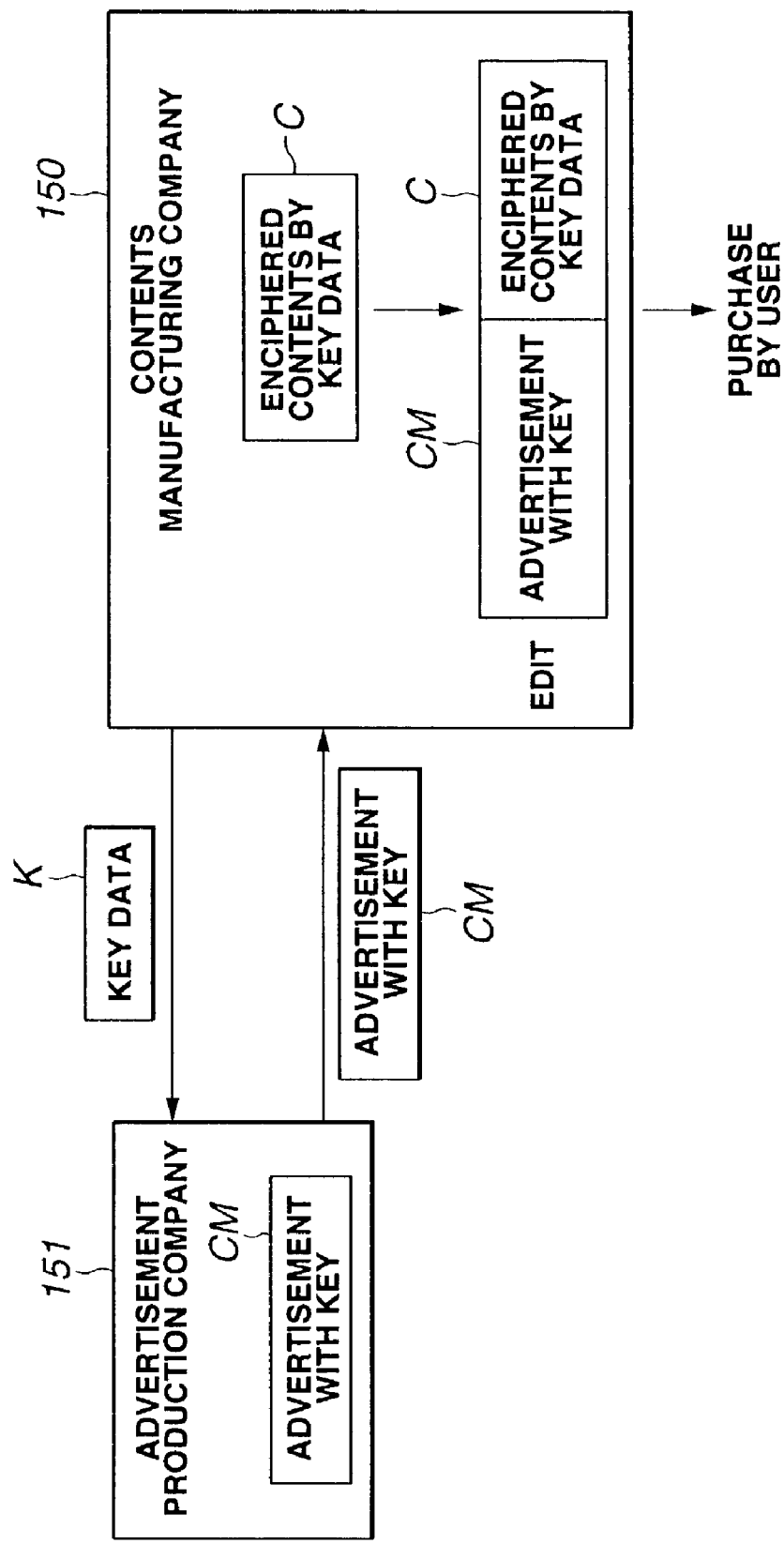
FIG. 23 is a view used for explanation of more practical example with respect to production of contents with advertisement.

While the fact that contents data and advertisement data are caused to correspond to each other is considered as a premise of this invention, preparation of the so-called contents with advertisement may be carried out by contents manufacturing company. The procedure in that case will be described with reference to FIG. 23. In this example, there is indicated as shown in FIG. 23 the case where enciphered contents by key data (cipher key) is manufactured at a contents manufacturing company 150 and advertisement with key CM is produced at the advertisement production company 151.

The contents manufacturing company 150.enciphers the manufactured contents data on the basis of key data (cipher key) K. In addition, the advertisement production company 151 prepares advertisement with key CM in which key data K is attached to (buried in) advertisement on the basis of key data K sent from the contents manufacturing company 150.

At the contents manufacturing company 150, the advertisement with key CM prepared at the advertisement production company 151 is used to prepare contents with advertisement by editing work in the state where that advertisement with key CM and contents C enciphered by key data K buried in the advertisement with key CM are caused to be integral. User purchases contents with advertisement prepared in this way.

While explanation has been given in the above-mentioned example in connection with the case where this invention is applied to the recording apparatus and the reproducing apparatus, etc., this invention can be further also applied to the transmitting apparatus or the receiving apparatus.

With respect to the transmitting apparatus, it is sufficient to change component succeeding to amplifiers 17, 36 in recording apparatuses 10, 30 as shown in FIGS. 1 to 3 into transmitting means. For example, as component of the transmitting means, carrier wave processing section, etc. is mentioned. While transmitting apparatus can be realized by changing component succeeding to the amplifiers 17, 36 into transmitting means in a manner stated above, it is sufficient to carry out processing similar to that of the above-described recording apparatuses 10, 30 as processing up to the preceding stage of the amplifiers 17, 36. Namely, modulation sections 16, 35 carry out modulation processing corresponding to transmitting processing with respect to inputted signal.

With respect to the receiving apparatus, it is sufficient to change component preceding to amplifiers 54, 74 for reading signal from the disc 200 in the reproducing apparatuses 50, 70 as shown in FIGS. 4 and 6 into receiving means. For example, as component of the receiving means, carrier wave processing section, etc. is mentioned. While the receiving apparatus can be realized by changing component succeeding to amplifiers 54, 74 into receiving means, components succeeding to amplifiers 54, 74 carry out receiving processing of data transmitted from the transmitting apparatus. Namely, demodulation sections 55, 75 carry out demodulation processing corresponding to receiving processing with respect to inputted signal.

At the above-described transmitting apparatus and receiving apparatus, transmission/reception of data is carried out through wireless broadcast, wire broadcast or network.

While explanation has been given by the example of disc such as optical disc, or magneto-optical disc, etc. as the recording medium in the above-described example, video tape and semiconductor memory, etc. may be employed as the recording medium. In this case, as the receiving means or reproducing means, means corresponding to the recording medium is used.

In accordance with the above-described example, when information desired to be necessarily reproduced such as advertisement or copyright management information, etc. is not reproduced, it is impossible to correctly reproduce contents data corresponding to main compilation or main part which is content of writings. Accordingly, users are permitted to compulsorily look at advertisement or copyright management information, etc.

In accordance with the above-described example, in the case of video image or television broadcast, since main part (compilation) cannot be seen until advertisement is run (reproduced), the advertisement effect can be more enhanced, For example, when attempt is made to carry out special reproduction such as skip, etc. of advertisement image by television image receiver with HDD (Hard Disc Drive), etc., it becomes impossible to correctly reproduce the main part (compilation). Accordingly, user is required to necessarily carry out ordinary reproduction of advertisement. By this approach, in this example, user is permitted to securely look at advertisement.

There may be also realized a system in which when watermark is buried so that reproduction of the main part or compilation portion of contents data is inhibited by copy operation carried out after conversion into analog signal as understood from such an example that in the case where there is employed such a system to bury watermark at the least significant bit of digital data as a system of burying cipher key into advertisement data, even if analog signal obtained by D/A conversion is caused to undergo A/D conversion to carry out conversion into digital signal for a second time, there is low possibility that the least significant watermark is completely reproduced. Thus, in the case where data is converted into analog signal and is copied, it becomes impossible to reproduce contents data which is caused to be main part (compilation) of the copied data. On one hand, only data of advertisement portion is reproduced.

There is employed an approach such that, in obtaining contents data from website, it is impossible to obtain contents data when Banner advertisement serving as operation portion is not clicked, thereby making it possible to necessarily look at Banner advertisement with respect to user.

As stated above, it becomes possible to allow effect of advertisement attached to contents to be greatest. Thus, user can purchase contents with advertisement at a low cost.

While explanation has been given by taking, as an example, the case where contents data is moving picture data (image) in the above-mentioned example, contents data is not limited to such moving picture data. For example, contents data may be still picture data, audio data or game data. Moreover, contents data may be data including at least one of moving picture data, still picture data, audio data and game data, etc. Accordingly, object to be concealed by data for concealment of contents that advertisement data includes may be contents data consisting of moving picture data and audio data, such as, for example, promotion video of musical composition data. In addition, as signal form of data enumerated as such contents data, there may be employed analog signal or there may be employed digital signal.

While signal recording form of contents data and advertisement data onto the disc 200 has been described with time divisional multiplexing or spatial division being as a premise in the above-described example, this invention is not limited to such an implementation. For example, advertisement data may be also recorded at the innermost circumferential side or the outermost circumferential side of data area of the disc 200. In this case, the above-described recording apparatuses 10, 30 and reproducing apparatuses 50, 70 are caused to be of configuration corresponding thereto. For example, the recording apparatus 10 or 30 records advertisement data at the innermost circumferential side or the outermost circumferential side of the disc 200 in a manner separate from contents data, and the reproducing apparatus reproduces advertisement data recorded at the innermost circumferential side or the outermost circumferential side of the disc 200. Thus, when the disc 200 is reproduced, reproduction of advertisement data is carried out prior to reproduction of contents data. When track jump, etc. is carried out to thereby conduct an operation to carry out reproduction of contents data in such a manner that reproduction of advertisement data is skipped, it is impossible to extract contents concealment data from advertisement data. For this reason, it is possible to prevent reproduction of contents data.

While explanation has been given in connection with the case where the above-described reproducing apparatuses 50, 70 respectively comprise demultiplexers 57, 77 at which division into contents data and advertisement data is carried out, and various processing are carried out at blocks succeeding thereto, this invention is not limited to the embodiments in which the reproducing apparatuses respectively comprise demultiplexers 57, 77. For example, there may be also employed a configuration such that advertisement data and contents data are caused to be inputted to cipher key extracting section 60 for extracting cipher key from advertisement data as they are to extract cipher key from advertisement data at a predetermined timing. There may be also employed a configuration such that advertisement data and contents data are caused to be inputted to predetermined area data extracting section 78 for extracting encipherment data used for encipherment from predetermined area of advertisement data as they are to extract the encipherment data from the advertisement data at a predetermined timing.

While the example where contents data and advertisement data are recorded on recording medium such as disc 200, etc. has been explained in the above-mentioned example, there may be also employed, as described below, such an approach to record in advance enciphered contents data on disc 200 to down-load, from server unit, advertisement data including cipher key for cryptanalyzing contents data.

Figure 24:
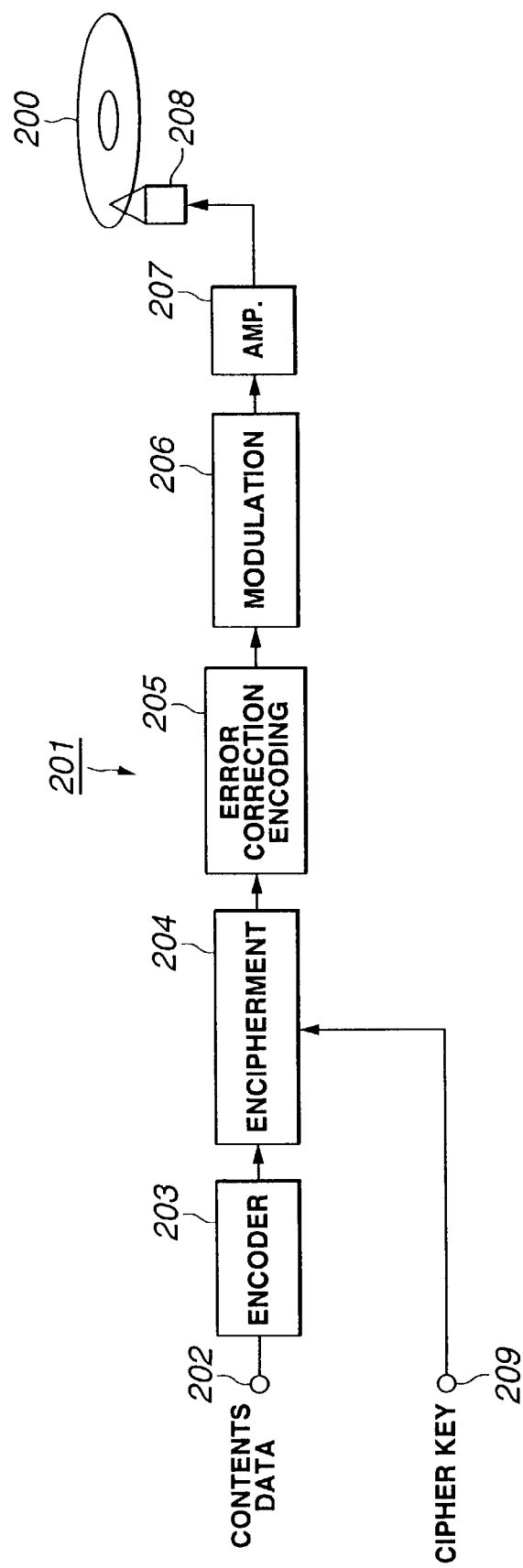
FIG. 24 is a block diagram for explaining a recording apparatus to which this invention is applied.

Namely, as shown in FIG. 23, contents manufacturing company 150 records enciphered contents data onto disc 200 by a recording apparatus 201 shown in FIG. 24 to supply it to user. In this example, the contents manufacturing company 150 supplies recording media for pay, for free or at a cost lower than ordinary cost. The advertisement production company 151 publicly announces advertisement data including cipher key used in enciphering contents data at website of a server unit 230. At the time of reproducing contents data recorded in enciphered state on the disc 200 by a reproducing apparatus 211 shown in FIG. 25, user down-loads advertisement data with respect to the reproducing apparatus 211 through network from the server unit 230 to reproduce this advertisement data to thereby purchase cipher key to cryptanalyze contents data by this cipher key to reproduce it.

Here, the recording apparatus 201 of the contents manufacturing company 150 will be described with reference to FIG. 24. This recording apparatus 201 comprises an encoder 203 for encoding contents data inputted from an input terminal 202, an enciphering section 204 for enciphering contents data encoded at the encoder 203, an error correction encoding section 205 for implementing error correction encoding processing to the contents data enciphered at the enciphering section 204, a modulation section 206 for implementing modulation processing to the contents data to which error correction code is added at the error correction encoding section 205, an amplifier 207 for amplifying contents data modulated at the modulation section 206, and an optical head 208 for recording contents data onto the disc 200. Cipher key for enciphering contents data is inputted from an input terminal 209. This cipher key is inputted to the enciphering section 204.

The recording apparatus 201 as described above is operative so that when contents data is inputted from the input terminal 202 and cipher key is inputted from the input terminal 209, it first encodes contents data by the above-described system such as MPEG 2, etc. by the encoder 203. Then, the contents data which has been caused to undergo encode processing is inputted to the enciphering section 204. The enciphering section 204 is supplied with cipher key inputted from the input terminal 209 to encipher the contents data which has been caused to undergo encode processing by using cipher key to output the enciphered contents data to the error correction encoding section 205. The error correction encoding section 205 implements error correction encoding processing to the inputted contents data to output it to the modulation section 206. The modulation section 206 implements modulation processing to the contents data which has been caused to undergo error correction encoding processing. Then, the amplifier 207 amplifies contents data recorded onto the disc 200. The optical head 208 implements recording processing to contents data to be recorded to record the contents data onto the disc 200.

Thus, the disc 200 on which enciphered contents data is recorded is packaged and is then delivered to user.

Figure 25:
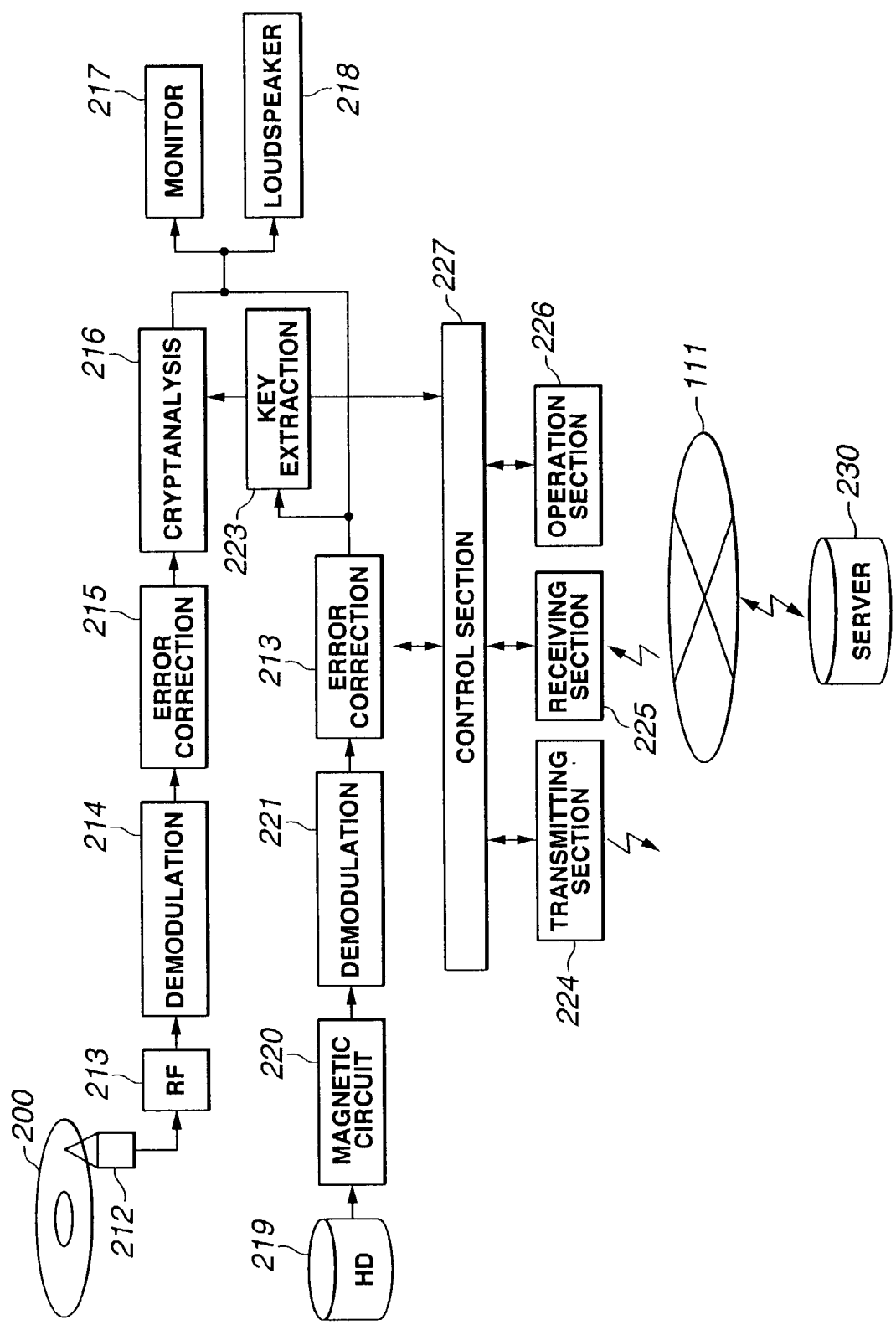
FIG. 25 is a block diagram for explaining a reproducing apparatus to which this invention is applied.

The reproducing apparatus 211 for reproducing disc 200 that user purchases, etc. will now be described with reference to FIG. 25. This reproducing apparatus 211 comprises an optical head 212 for irradiating light beams onto the disc 200 to read out contents data recorded on the disc 200, a RF amplifier 213 for amplifying contents data inputted from the optical head 212 to extract RF signal, etc., a demodulation section 214 for implementing demodulation processing to the contents data inputted from the RF amplifier 213, an error correction section 215 for implementing error correction processing to the demodulated contents data, a cryptanalyzing section 216 for cryptanalyzing contents data which has been caused to undergo error correction at the error correction section 215, and a monitor 217 and a loudspeaker 218 for outputting cryptanalyzed contents data.

The reproducing apparatus 211 comprises a memory section 219 for preserving (storing) advertisement data, etc. which has been down-loaded from the server unit 230, a magnetic circuit 220 for recording data into the memory section 219 and for reading out data preserved (stored) in the memory section 219, a demodulation section 221 for demodulating the data which has been read out at the magnetic circuit 220, an error correction section 222 for implementing error correction processing to the data which has been demodulated at the demodulation section 221, and an extracting section 223 for extracting cipher key from the advertisement data, etc. to which error correction processing has been implemented at the error correction section 222. Further, the reproducing apparatus 211 comprises a transmitting section 224 for transmitting data to the server unit 230, a receiving section 225 for receiving the data which has been transmitted from the server unit, an operation section 226 operated by user, and a control section 227 for controlling the entirety of the apparatus in accordance with input from the operation section 226.

Figure 26:
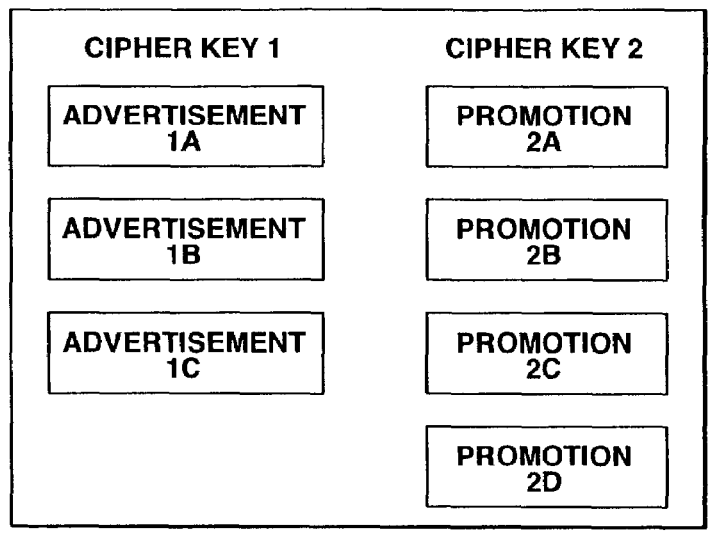
FIG. 26 is a view for explaining website installed at server unit.

In this example, at the server unit 230 that the reproducing apparatus 211 accesses, website 231 as shown in FIG. 26 is installed. At this website 231, Banner advertisements 1A to 1C and Banner advertisements 2A to 2D which are related to contents data are provided. In the case where these Banner advertisements 1A to 1C, 2A to 2D are clicked by the operation section 226 when website 231 is displayed on the monitor 217 of the reproducing apparatus 211, data related to contents data, e.g., advertisement data, promotion data is adapted so that new web page is opened. Here, cipher key when contents data is enciphered is included in advertisement data, etc.

In reproducing contents data enciphered and recorded on the disc 200, the reproducing apparatus 211 is required to first down-load contents data from the server unit 230. To realize this, the reproducing apparatus 211 first operates the operation section 226 to thereby input a predetermined URL recorded at, e.g., accommodating case (housing), etc. of the disc 200 to provide access to the server unit 230 to display website 231 on the monitor 217. User clicks Banner advertisements 1A to 1C, 2A to 2D of contents data to be reproduced by the operation section 226. Thus, the reproducing apparatus 211 transmits transmitting request from the transmitting section 224 to receive display data corresponding to the clicked Banner advertisement from the server unit 230 which has received this transmitting request to preserve (store) it into the memory section 219. The reproducing apparatus 211 displays web page on the monitor 217. At this time, the reproducing apparatus 211 down-loads advertisement data in which cipher key of contents data is included from this web page. This advertisement data, etc. is preserved (stored) into the memory section 219.

Figure 27:
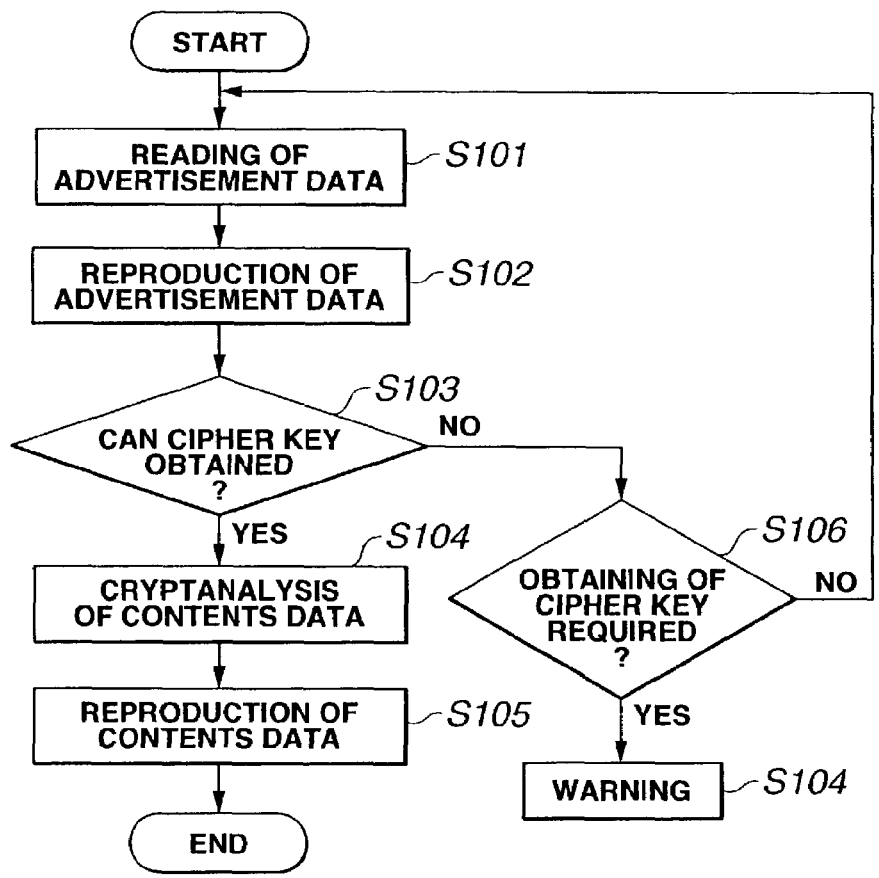
FIG. 27 is a flowchart for explaining the operation of the reproducing apparatus.

Here, when user loads the disc 200 with respect to the loading portion to attempt to start reproduction of contents data enciphered and recorded on the disc 200, the control section 227 starts reproduction of advertisement data. Namely, as shown in FIG. 27, at step S101, the magnetic circuit 220 reads out advertisement data from the memory section 219. At step S102, the reproducing apparatus 211 carries out demodulation processing of advertisement data thereafter to implement error correcting processing to output the data thus processed from the monitor 217 or the loudspeaker 218. At this time, the extracting section 223 extracts cipher key used for encipherment of contents data from the error-corrected advertisement data.

At step S103, the control section 226 judges whether or not the extracting section 223 can extract cipher key. When the cipher key can be extracted, processing by the control section 226 proceeds to step S104. When the cipher key cannot be extracted, processing by the control section 226 proceeds to step S106.

When the cipher key can be extracted at the extracting section 223 and reproduction of contents data enciphered and recorded on the disc 200 is started, the contents data is amplified at the RF amplifier 213, is demodulated at the demodulation section 214, and is caused to undergo error correcting processing at the error correcting section 215 at the step S104. Further, at the step S104, the error-corrected contents data is cryptanalyzed by cipher key inputted from the extracting section 223 at the cryptanalyzing section 216, and is outputted to the monitor 217 or the loudspeaker 218.

Further, at the step S103, when reproduction of contents data enciphered and recorded on the disc 200 is carried out in the state where cipher key fails to be extracted at the extracting section 223, the control section 227 judges as to whether or not contents data to be reproduced is required to be cryptanalyzed, i.e., reproduction of advertisement data is required prior to reproduction of contents data. When such reproduction is required, processing by the control section 227 proceeds to step S107. When such reproduction is not required, processing by the control section 227 returns to the step S101.

At the step S107, the control section 227 carries out, e.g., warning display indicating that reproduction of advertisement data is required prior to reproduction of contents data on the monitor 217, etc.

Additionally, when advertisement data including cipher key is down-loaded, the server unit 230 may implement charging processing. Thus, in this system, when the discs 200 are distributed to users, the cost is permitted to be free, or is permitted to be lower than ordinary cost.

Here, with respect to burying of cipher key into advertisement data, the predetermined line data d of the predetermined frame picture P of advertisement data may be used as data for encipherment as it is as shown in the above-mentioned FIG. 7. Moreover, data of the entirety of predetermined frame picture P of advertisement data may be used as data for encipherment as shown in the above-mentioned FIG. 8. Further, cipher key d may be buried during blanking period in signal of a predetermined frame of advertisement data, i.e., at the portion positioned at the outside of display picture P as shown in the above-mentioned FIG. 9. Furthermore, data (portion of cipher key) d may be buried into portions of corresponding respective frame pictures F over all frames. Still furthermore, cipher key may be buried into low order data in picture signal by using watermark as shown in the above-mentioned FIGS. 11 and 12.

As a method of enciphering contents data, contents data may be enciphered by using one cipher key or plural cipher keys buried into four advertisement data of advertisements 1 to 4 as shown in the above-mentioned FIG. 14. Moreover, one cipher key may be generated by Hash function which is unidirectional function by using cipher keys buried in four advertisement data of advertisements 1 to 4 to encipher contents data on the basis of that cipher key as shown in the above-mentioned FIG. 15. Further, advertisement data may be enciphered on the basis of cipher key of other advertisement data as shown in the above-mentioned FIG. 16. Furthermore, respective corresponding areas A(1) to A(4) of quadrisected contents data A may be enciphered by cipher keys buried in respective advertisement data of advertisements 1 to 4.

In accordance with the above-described examples, when information desired to be necessarily reproduced such as advertisement or copyright management information, etc. is not reproduced, it is impossible to correctly reproduce contents data (main compilation or main part). Accordingly, user is permitted to compulsorily look at advertisement or copyright management information, etc.

While the example where contents data is provided by disc 200 to down-load advertisement data from server unit 230 has been described in the above-mentioned examples, this invention may be such that second contents data such as advertisement data, etc. are distributed by recording medium such as optical disc, magneto-optical disc, magnetic disc or semiconductor memory, etc., and first contents data such as movie, game or music, etc. are down-loaded from server unit 230. The first contents data and/or the second contents data may be distributed through wireless broadcast or wire broadcast, etc.

INDUSTRIAL APPLICABILITY

In accordance with this invention, since there is employed such an approach to reproduce predetermined data to obtain data for concealment of contents to release concealment of contents on the basis of the obtained contents concealment data to carry out reproduction, predetermined data is necessarily reproduced prior to contents data. Thus, in data recording medium, when predetermined data is advertisement, advertisement data can be reproduced in a manner preceding to contents data. Accordingly, the advertisement effect can be more enhanced.

The invention claimed is:

1. A recording medium in which second data, in which content concealment data for concealing content data are buried, are recorded at a position where reproduction is conducted prior to first data including the content data when the first data are reproduced, wherein the content data in the first data recorded on the medium are outputtable at least one of visibly or audibly at a first time only if the second data, which has been reproduced from the medium, are at least one of visibly or audibly output to a user of the recording medium at a second time, wherein the second time precedes the first time.

2. The recording medium as set forth in claim 1, wherein the second data include at least one unit of advertisement data.

3. The recording medium as set forth in claim 1, wherein the second data include a plurality of units of advertisement data, and the content concealment data are buried in the plurality of units of advertisement data in a distributed manner.

4. The recording medium as set forth in claim 1, wherein the second data include a plurality of units of advertisement data, encipherment processing is respectively implemented to the plurality of units of advertisement data and to key data for decoding encipherment processing implemented to one unit of advertisement data of remaining advertisement data buried in a predetermined unit of the plurality of units of advertisement data, and the content concealment data are buried in a unit of advertisement data last reproduced of the plurality of unit advertisement data.

5. The recording medium as set forth in claim 1, wherein the content concealment data are buried during a blanking period of the second data.

6. A recording medium in which first data and second data are recorded, the second data are recorded at a position where a read-out operation of the second data is conducted prior to the first data in reproducing the first data, and the first data are recorded after encipherment processing is performed by using data extracted from the second data, wherein the first data recorded on the medium are outputtable at least one of visibly or audibly at a first time only if the second data, which has been read-out from the medium, are at least one of visibly or audibly output to a user of the recording medium at a second time, wherein the second time precedes the first time.

7. The recording medium as set forth in claim 6, in which the second data include at least one unit of advertisement data.

8. The recording medium as set forth in claim 6, wherein the data extracted from the second data are predetermined line data of a predetermined frame of the advertisement data.

9. The recording medium as set forth in claim 6, wherein the data extracted from the second data are data of a predetermined frame of the advertisement data.

10. A recording method for a recording medium, the method comprising the steps of:
   burying content concealment data for concealing first data including content data in delivered second data;
   implementing concealment processing to the first data by using the content concealment data; and
   implementing encode processing to the second data in which the content concealment data are buried and the content data to which the concealment processing has been implemented to record the processed encoded data onto the recording medium, wherein the content data in the processed encoded data on the recording medium are outputtable at least one of visibly or audibly at a first time only if the second data, which has been reproduced from the processed encoded data of the recording medium, are at least one of visibly or audibly output to a user of the recording medium at a second time, wherein the second time precedes the first time.

11. The recording method as set forth in claim 10, further including the steps of: multiplexing the second data in which the content concealment data are buried and the content data to which the concealment processing has been implemented; and implementing the encode processing to the multiplexed data.

12. The recording method as set forth in claim 10, wherein the second data include at least one unit of advertisement data.

13. The recording method as set forth in claim 10, wherein the second data includes a plurality of units of advertisement data and the content concealment data are buried in the plurality of units of advertisement data in a distributed manner.

14. The recording method as set forth in claim 10, wherein the content concealment data are buried during a blanking period of the second data.

15. The recording method as set forth in claim 10, the method further including the steps of: implementing compression processing to the respective first data and second data in which the content concealment data are buried; and implementing the concealment processing to the first data and second data to which the compression processing has been implemented.

16. The recording method as set forth in claim 10, wherein the second data in which the content concealment data are buried are recorded at a position on the recording medium where a read-out operation is performed prior to the first data.

17. A recording method for a recording medium, comprising the steps of:
implementing encipherment processing to first data including content data by using data extracted from delivered second data; and
implementing encode processing to the second data and the first data to which the encipherment processing has been implemented to record the processed data onto the recording medium, wherein the content data in the processed encoded data on the recording medium are outputtable at least one of visibly or audibly at a first time only if the second data, which has been reproduced from the processed data on the recording medium, are at least one of visibly or audibly output to a user of the recording medium at a second time, wherein the second time precedes the first time.

18. The recording method as set forth in claim 17, the method including the steps of: multiplexing the second data and the first data to which the encipherment processing has been implemented; and implementing the encode processing to the multiplexed data.

19. The recording method as set forth in claim 17, wherein the second data include at least one unit of advertisement data.

20. The recording method as set forth in claim 17, wherein the data extracted from the second data are predetermined line data of a predetermined frame of the advertisement data.

21. The recording method as set forth in claim 17, wherein the data extracted from the second data are data of a predetermined frame of the advertisement data.

22. The recording method as set forth in claim 17, wherein the second data in which content concealment data are buried are recorded at a position on the recording medium where a read-out operation is conducted prior to the first data.

23. A data recording method, comprising the steps of:
respectively burying cipher key data for implementing encipherment processing to first data including content data into a plurality of units of delivered second data;
implementing concealment processing to at least a partial area of the first data based on the cipher key data buried in the second data; and
implementing encode processing to the second data in which content concealment data are buried and the content data to which the concealment processing has been implemented to record the processed encoded data, wherein the content data of the processed encoded data are outputtable at least one of visibly or audibly at a first time only if the second data, which has been reproduced from the processed encoded data, are at least one of visibly or audibly output to a user at a second time, wherein the second time precedes the first time.

24. The data recording method as set forth in claim 23, wherein the plurality of units of second data respectively include advertisement data and the method further includes the steps of: generating the content concealment data by using the cipher key data read from the advertisement data; and implementing concealment processing to the first data based on the generated content concealment data.

25. The data recording method as set forth in claim 23, wherein the plurality of units of second data respectively include advertisement data and the method further includes a step of implementing concealment processing to a plurality of respective areas of the first data by using the cipher key data read from the advertisement data.

26. A reproducing method for a recording medium, comprising the steps of:
extracting content concealment data for concealing content data from second data read from a recording medium adapted so that the second data, in which the contents concealment data are buried, are recorded at a position where reproduction is performed prior to first data including the content data in reproducing the first data;
decoding a cipher implemented to the first data read from the recording medium by using the extracted content concealment data; and
providing that the content data of the first data are outputtable at least one of audibly or visibly at a first time only if the second data, which has been read from the medium, are at least one of audibly or visibly output to a user of the medium at a second time, wherein the second time precedes the first time.

27. The reproducing method as set forth in claim 26, the method further including the steps of: temporarily taking the second data read from the recording medium into a buffer memory; and extracting the content concealment data from the second data taken into the buffer memory.

28. The reproducing method as set forth in claim 26, wherein reproduction of the first data is stopped when one of the second data fail to be read from the recording medium and the content concealment data fail to be extracted from the second data.

29. The reproducing method as set forth in claim 26, wherein, when the second data undergo special reproduction such that the second data cannot be audibly or visibly output in a predetermined manner, cryptanalysis processing of the first data is stopped.

30. A reproducing method for a recording medium, comprising the steps of:
- reading second data from a recording medium adapted so that first data and the second data are recorded, the second data being recorded at a position where a read operation is performed prior to the first data in reproducing the first data and the first data being recorded after encipherment processing by using data extracted from the second data;
- extracting data of a predetermined area of the second data read;
- decoding a cipher implemented to the first data read from the recording medium by using the extracted data; and
- providing that the first data are outputtable at least one of visibly and audibly at a first time only if the second data, which has been reproduced from the medium, are at least one of audibly or visibly output to a user of the recording medium at a second time, wherein the second time precedes the first time.

31. The reproducing method as set forth in claim 30, wherein reproduction of the first data is stopped when one of the second data fail to be read from the recording medium and the data of the predetermined area fail to be extracted from the second data.

32. The reproducing method as set forth in claim 30, wherein, when the second data undergo special reproduction such that the second data is audibly or visibly output to the user in other than a predetermined manner, cryptanalysis processing of the first data is stopped.

33. A transmitting method for data, comprising the steps of:
- burying content concealment data for concealing first data including content data into delivered second data;
- implementing concealment processing to the first data by using the content concealment data; and
- implementing encode processing to the second data in which the content concealment data are buried and the content data to which the concealment processing has been implemented to transmit the processed encoded data, wherein the content data of the processed encoded data are outputtable at least one of visibly or audibly at a first time only if the second data, which has been reproduced from the processed data, are at least one of visibly or audibly output to a user at a second time, wherein the second time precedes the first time.

34. The transmitting method as set forth in claim 33, the method further including the steps of: multiplexing the second data in which the content concealment data are buried and the content data to which the concealment processing has been implemented; and implementing the encode processing to the multiplexed data.

35. The transmitting method as set forth in claim 33, wherein the second data include at least one unit of advertisement data.

36. The transmitting method as set forth in claim 33, wherein the second data include a plurality of units of advertisement data and the content concealment data are buried into the plurality of units of advertisement data in a distributed manner.

37. The transmitting method as set forth in claim 33, wherein the content concealment data are buried during a blanking period of the second data.

38. The transmitting method as set forth in claim 33, the method further including the steps of: implementing compression processing to respective ones of the first data and the second data in which the content concealment data are buried; and implementing the concealment processing to the first and second data to which the compression processing has been implemented.

39. A transmitting method for data, comprising the steps of:
- implementing encipherment processing to first data including content data by using data extracted from delivered second data; and
- implementing encode processing to the second data and the first data to which the encipherment processing has been implemented to transmit the processed encoded data, wherein the content data of the processed encoded data are outputtable at least one of visibly or audibly at a first time only if the second data, which has been reproduced from the processed data, are at least one of visibly or audibly output to a user at a second time, wherein the second time precedes the first time.

40. The transmitting method as set forth in claim 39, wherein the method includes the steps of: multiplexing the second data and the first data to which the encipherment processing has been implemented; and implementing the encode processing to the multiplexed data.

41. The transmitting method as set forth in claim 39, wherein the second data include at least one unit of advertisement data.

42. The transmitting method as set forth in claim 39, wherein the data extracted from the second data are predetermined line data of a predetermined frame of the advertisement data.

43. The transmitting method as set forth in claim 39, wherein the data extracted from the second data are data of a predetermined frame of the advertisement data.

44. A data reproducing method, comprising the steps of:
- extracting content concealment data for concealing content data from second data, in which the content concealment data are buried, of data reproduced prior to first data including the content data in reproducing the first data and including the second data;
- decoding a cipher implemented to the first data by using the extracted content concealment data; and
- providing that the first data are outputtable at least one of audibly or visibly at a first time only if the second data, which has been reproduced, are at least one of audibly or visibly output to a user at a second time, wherein the second time precedes the first time.

45. The data reproducing method as set forth in claim 44, the method further including the steps of:
- temporarily taking the second data into a buffer memory; and extracting the content concealment data from the second data taken into the buffer memory.

46. The data reproducing method as set forth in claim 44, wherein, when the second data undergo special reproduction such that the second data is audibly or visibly output in other than a predetermined manner, cryptanalysis processing of the first data is stopped.

47. The data reproducing method as set forth in claim 44, wherein when one of the second data fail to be read and the content concealment data fail to be extracted from the second data reproduction of the first data is stopped.

48. The data reproducing method as set forth in claim 47, wherein when the second data undergo special reproduction such that the second data cannot be audibly or visibly output in a predetermined manner, cryptanalysis processing of the first data is stopped.

49. A data reproducing method, comprising the steps of:
- extracting data of a predetermined area of second data of data including first data and the second data, the second data being disposed where a read operation is performed prior to the first data in reproducing the first data and the first data undergoing encipherment processing by using the data extracted from the second data;

decoding a cipher implemented to the first data by using the extracted data; and providing that the first data are outputtable at least one of audibly or visibly at a first time only if the second data, which has been reproduced, are at least one of audibly or visibly output to a user at a second time, wherein the second time precedes the first time.

50. The data reproducing method as set forth in claim 49, wherein when one of the second data fail to be read and the data of the predetermined area fail to be extracted from the second data reproduction of the first data is stopped.

51. The data reproducing method as set forth in claim 49, wherein, when the second data undergo special reproduction such that the second data cannot be audibly or visibly output in a predetermined manner, cryptanalysis processing of the first data is stopped.

52. A reproducing method, comprising steps of:

taking second data, in which content concealment data is buried, into a reproducing apparatus through a network, in reproducing first data including content data of a recording medium adapted so that the first data are recorded after encipherment processing based on the content concealment data;

extracting the content concealment data from the second data taken in;

decoding a cipher implemented to the first data read from the recording medium by using the extracted content concealment data; and providing that the first data are outputtable at least one of audibly or visibly at a first time only if the second data, which has been reproduced, are at least one of audibly or visibly output to a user of the recording medium at a second time, wherein the second time precedes the first time.

53. The reproducing method as set forth in claim 52, wherein the second data include at least one unit of advertisement data.

54. The reproducing method as set forth in claim 52, the method further including the steps of:

temporarily taking the second data into a memory section; and extracting the content concealment data from the second data taken into the memory section.

55. The reproducing method as set forth in claim 52, the method further including a step of discriminating whether cryptanalysis processing is required for the first data read from the recording medium when the content concealment data fail to be extracted from the second data, whereby when it is discriminated that the cryptanalysis processing is required a warning display is performed.

56. The reproducing method as set forth in claim 52, wherein the content concealment data are buried during a blanking period of the second data.

* * * * *